(12) United States Patent
Takenaka et al.

(10) Patent No.: US 10,876,010 B2
(45) Date of Patent: Dec. 29, 2020

(54) COMPOSITE PARTICLES, METHOD FOR PRODUCING COMPOSITE PARTICLES, AND USE THEREOF

(71) Applicant: SEKISUI KASEI CO., LTD., Osaka (JP)

(72) Inventors: Toshiki Takenaka, Koka (JP); Mayumi Takayama, Koka (JP); Akiyoshi Kusaka, Tenri (JP); Masaaki Nakamura, Koka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 113 days.

(21) Appl. No.: 16/165,238

(22) Filed: Oct. 19, 2018

(65) Prior Publication Data

US 2019/0055425 A1    Feb. 21, 2019

Related U.S. Application Data

(62) Division of application No. 15/035,018, filed as application No. PCT/JP2013/080723 on Nov. 13, 2013, now abandoned.

(51) Int. Cl.
  *C08F 2/18*    (2006.01)
  *C08F 2/44*    (2006.01)
  (Continued)

(52) U.S. Cl.
  CPC ............. *C09D 7/61* (2018.01); *C08F 2/18* (2013.01); *C08F 2/44* (2013.01); *C08F 220/14* (2013.01);
  (Continued)

(58) Field of Classification Search
  CPC .......... C09D 133/12; C09D 7/61; C09D 7/40; C09D 201/00; C08F 2/18; C08F 2/44;
  (Continued)

(56) References Cited

U.S. PATENT DOCUMENTS

| 6,451,941 B1 | 9/2002 | Urashima et al. |
| 7,579,391 B2 | 8/2009 | Takahashi et al. |
| 2012/0238705 A1 | 9/2012 | Sekiya |

FOREIGN PATENT DOCUMENTS

| JP | 62-266561 | 11/1987 |
| JP | 10-298774 | 11/1988 |

(Continued)

OTHER PUBLICATIONS

Furusawa et al., "Preparation of Composite Polymer Latices Including Inorganic Particles," Kobunshi Ronbunshu, vol. 40 No. 10, pp. 697-702. (Year: 1983).*

(Continued)

*Primary Examiner* — Josephine L Chang
(74) *Attorney, Agent, or Firm* — Wenderoth, Lind & Ponack, L.L.P.

(57) ABSTRACT

In a method for producing composite particles containing polymer particles and silica particles that adhere to the polymer particles, the composite particles are obtained by subjecting a polymerizable monomer to aqueous suspension polymerization in a presence of silica particles and a cellulose compound adsorbing onto the silica particles. The composite particles contain the polymer particles, the silica particles that adhere to surfaces of the polymer particles, and the water-soluble cellulose compound.

3 Claims, 2 Drawing Sheets

(51) Int. Cl.
  *C08K 3/36* (2006.01)
  *C09D 133/12* (2006.01)
  *C08F 220/14* (2006.01)
  *C09D 7/61* (2018.01)
  *C09D 201/00* (2006.01)
  *C09D 7/40* (2018.01)
  *C08J 3/12* (2006.01)

(52) U.S. Cl.
  CPC .............. *C08J 3/126* (2013.01); *C08J 3/128* (2013.01); *C09D 7/40* (2018.01); *C09D 133/12* (2013.01); *C09D 201/00* (2013.01); *C08J 2333/06* (2013.01); *C08J 2401/04* (2013.01); *C08K 3/36* (2013.01)

(58) Field of Classification Search
  CPC .......... C08F 220/14; C08J 3/126; C08J 3/128; C08J 2333/06; C08J 2401/04; C08K 3/36
  USPC ....................................................... 524/559
  See application file for complete search history.

(56) References Cited

FOREIGN PATENT DOCUMENTS

| JP | 04256345 | 9/1992 |
|---|---|---|
| JP | 5-320534 | 12/1993 |
| JP | 07-173997 | 11/1995 |
| JP | 7-309918 | 11/1995 |
| JP | 10-237216 | 9/1998 |
| JP | 2000-355639 | 12/2000 |
| JP | 2003-064110 | 3/2003 |
| JP | 2006-037090 | 2/2006 |
| JP | 2007-217645 | 8/2007 |
| JP | 2010-229229 | 10/2010 |
| WO | 2011/062173 | 5/2011 |

OTHER PUBLICATIONS

JP 10-298774 A, machine translation, EPO Espacenet. (Year: 1998).*
International Search Report dated Dec. 10, 2013, issued for PCT/JP2013/080723.
Informal Comments dated Mar. 14, 2016, responding to Written Opinion of the International Searching Authority dated Dec. 10, 2013, issued for PCT/JP2013/080723 and English translation thereof, including reference document.
JP 04-256345 A, machine translation, JPO Japan Platform for Patent Information (J-PlatPat). (Year: 1992).
Office Action dated Aug. 3, 2016, issued for the corresponding Taiwanese patent application No. 1020141928 and Japanese translation thereof.

* cited by examiner

COMPOSITE PARTICLES, METHOD FOR PRODUCING COMPOSITE PARTICLES, AND USE THEREOF

TECHNICAL FIELD

The present invention relates to composite particles containing polymer particles and silica particles that adhere to surfaces of the polymer particles, a method for producing the composite particles and the use thereof (i.e., an external preparation, a coating agent, an optical film, a resin composition and a molded product).

BACKGROUND ART

Polymer particles having the average particle diameter of 0.01 to 100 μm are used, for example, for an additive (e.g., flatting agent) for a coating agent such as coating material, an additive (e.g., flatting agent) for ink, a main component of or an additive for an adhesive, an additive (e.g., shrinkage reducing agent) for cultured marble, a paper treating agent, a filler (filler for improving lubricity) for an external preparation such as cosmetics, a column packing material for chromatography, a toner additive for developing an electrostatic image, an anti-blocking agent for a film, and a light diffusing agent for a light diffuser (e.g., light diffusion film).

The above polymer particles are generally produced by suspension polymerization of a polymerizable monomer. A suspension stabilizer such as silica is used for the suspension polymerization so that droplets containing the polymerizable monomer can be polymerized in a system in which the droplets are stably suspended without coalescing. Thus, it is possible to obtain fine polymer particles having uniform particle diameter distribution.

For example, Patent Literature 1 recites a method including the steps of: stirring a composition containing an aqueous medium, a polymerizable monomer, a polymerization initiator, an inorganic dispersant (e.g., colloidal silica) and an emulsifier so as to form a dispersion in which oil droplets are dispersed in the aqueous medium; and heating while stirring the dispersion so as to polymerize the polymerizable monomer. By this method, it is possible to obtain resin particles (polymer particles) having uniform particle diameter.

CITATION LIST

Patent Literature

[Patent Literature 1] WO 2011/062173 A1

SUMMARY OF INVENTION

Technical Problem

Recently, compounding polymer particles with silica particles has been considered as one method for allowing the polymer particles to have new properties or to improve their properties. For example, it is conceivable that hydrophilicity of the surface of the particles and hardness of the particles themselves can be improved by adhering the silica particles to the surfaces of the polymer particles. Since the particles whose surface has hydrophilicity are easily dispersed in an aqueous medium, they can be suitably used as an additive (e.g., flatting agent) for an aqueous coating agent such as aqueous coating material and the like, and as a raw material for an aqueous external preparation such as lotion. Also, since the hardness of the particles themselves is improved, improvement in scratch resistance can be expected when they are used as the additive for a coating agent such as coating material.

By the method disclosed in Patent Literature 1, it is possible to obtain the resin particle whose surface is covered by an inorganic dispersant in an amount of 0.0001 to 0.02 $g/m^2$. However, this method was made for the purpose of obtaining the resin particle (polymer particle) whose surface has a small amount of adhered inorganic dispersant such as silica. Accordingly, by this method, adhesion of the inorganic dispersant to the surface of the resin particle is suppressed. Such small amount of silica particles does not strongly adhere to the surface of the resin particle obtained by the above method, and easily fall off the resin particle.

The present invention was made in consideration of the above circumstances, an object of which is to provide: a method for producing composite particles in which silica particles hardly fall off surfaces of polymer particles; composite particles obtainable by the method; and use of the composite particles.

Solution to Problem

In a method for producing composite particles of the present invention, the produced composite particles contain polymer particles and silica particles that adhere to the polymer particles. The method includes a polymerization step of subjecting a polymerizable monomer to aqueous suspension polymerization in the presence of silica particles and a water-soluble cellulose compound adsorbing onto surfaces of the silica particles, so that the composite particles are obtained.

In the above method for producing the composite particles, the polymerizable monomer is subjected to the aqueous suspension polymerization in the presence of the silica particles and the water-soluble cellulose compound adsorbing onto the surfaces of the silica particles, which allows the silica particles to strongly adhere to the surfaces of the polymer particles due to the function of the water-soluble cellulose compound adsorbing onto the surfaces of the silica particles. For this reason, it is possible to obtain the composite particles in which the silica particles hardly fall off the surface of the polymer particles.

The composite particles of the present invention contain the polymer particles, the silica particles that adhere to the surfaces of the polymer particles, and the water-soluble cellulose compound.

In the composite particles, the silica particles strongly adhere to the surfaces of the polymer particles because of the water-soluble cellulose compound being contained, thus, the silica particles hardly fall off the surfaces of the polymer particles.

An external preparation of the present invention contains the composite particles of the present invention.

The external preparation of the present invention has good lubricity because it contains the composite particles of the present invention. Also, when the external preparation of the present invention contains an aqueous solvent, it is possible to obtain a good dispersibility of the composite particles due to hydrophilicity of the silica particles that adhere to the surfaces of the polymer particles.

A coating agent of the present invention contains the composite particles of the present invention.

Since the coating agent of the present invention contains the composite particles of the present invention, it is possible to give the light diffusibility to a coating film formed by the coating agent. Also, in the coating agent of the present invention, the hardness of the composite particles is ensured by the silica particles that adhere to the surfaces of the polymer particles. Thus, the improvement in the scratch resistance of the coating film formed by the coating agent can be expected. Furthermore, when the coating agent of the present invention contains the aqueous solvent, it is possible to obtain an excellent dispersibility of the composite particles due to the hydrophilicity of the silica particles that adhere to the surfaces of the polymer particles.

An optical film of the present invention is obtainable by applying the coating agent onto a base material.

The optical film of the present invention contains the coating agent of the present invention, thus has the light diffusibility.

A resin composition of the present invention contains the composite particles of the present invention and a base resin.

The resin composition of the present invention contains the composite particles of the present invention, thus has the light diffusibility.

A molded product of the present invention is obtainable by molding the resin composition of the present invention.

Since the molded product of the present invention is obtainable by molding the resin composition containing the composite particles of the present invention, the molded product of the present invention has the light diffusibility due to containing of the composite particles of the present invention.

Advantageous Effects of Invention

The present invention can provide: the method for producing the composite particles in which the silica particles hardly fall off the surfaces of the polymer particles; the composite particles obtainable by the above method; and the use of the composite particles.

DESCRIPTION OF EMBODIMENTS

Figure 1:
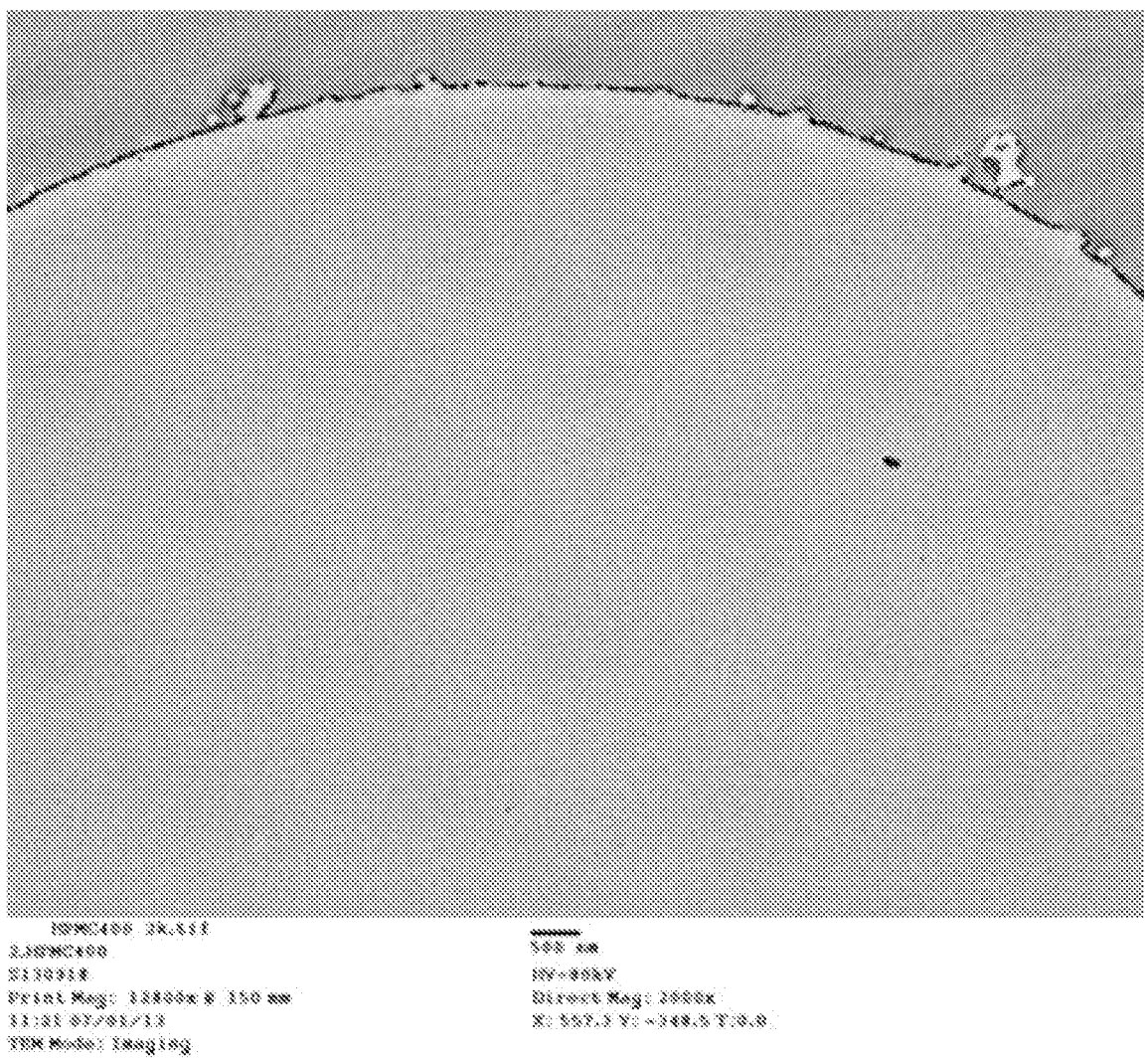
FIG. 1 is a transmission electron microscope (TEM) image showing an enlarged part of a cross section of a composite particle obtained in Example 1 of the present invention.

Hereinafter, the present invention will be described in detail.

[Method for Manufacturing Composite Particles]

The present invention provides a method for producing composite particles containing polymer particles and silica particles that adhere to the polymer particles. The method includes a polymerization step of obtaining the composite particles by subjecting a polymerizable monomer to aqueous suspension polymerization in the presence of silica particles and a water-soluble cellulose compound adsorbing onto surfaces of the silica particles.

(Polymerizable Monomer)

The polymerizable monomer used for the producing method of the present invention is not particularly limited. However, it is preferable to use, for example, a compound not having a phosphate ester bond but having a polymerizable carbon-carbon double bond (a vinyl bond in a wide sense), hereinafter simply referred to as a polymerizable vinyl monomer.

The polymerizable vinyl monomer is not particularly limited. Examples thereof include a monofunctional monomer having an alkenyl group (a vinyl group in a wide sense) and a polyfunctional monomer having at least two alkenyl groups (vinyl groups in a wide sense).

Examples of the monofunctional monomer include: α-methylene aliphatic monocarboxylic acid ester; styrene; styrene derivatives such as o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene; vinyl carboxylates such as vinyl acetate, vinyl propionate and vinyl butylate; acrylic acid derivatives other than acrylic acid ester, i.e., acrylonitrile, acrylamide and the like; and methacrylic acid derivatives other than methacrylic acid ester, i.e., methacrylonitrile, methacrylamide and the like.

Examples of the α-methylene aliphatic monocarboxylic acid ester include: acrylic acid esters such as methyl acrylate, ethyl acrylate, propyl acrylate, n-butyl acrylate, isobutyl acrylate, n-octyl acrylate, dodecyl acrylate, 2-ethyhexyl acrylate, stearyl acrylate, lauryl acrylate, 2-chloroethyl acrylate, phenyl acrylate, 2-(dimethylamino)ethyl acrylate, 2-(diethylamino)ethyl acrylate, 2-hydroxyethyl acrylate, and 2-hydroxypropyl acrylate; methacrylic acid esters such as methyl methacrylate, ethyl methacrylate, propyl methacrylate, n-butyl methacrylate, isobutyl methacrylate, n-octyl methacrylate, dodecyl methacrylate, 2-ethyhexyl methacrylate, stearyl methacrylate, lauryl methacrylate, phenyl methacrylate, 2-(dimethylamino)ethyl methacrylate, 2-(diethylamino)ethyl methacrylate, 2-hydroxyethyl methacrylate, and 2-hydroxypropyl methacrylate; and α-haloacrylic acid ester such as methyl α-chloroacrylate.

Depending on the circumstances, it is possible to use α,β-unsaturated carboxylic acids such as acrylic acid, methacrylic acid, maleic acid and fumaric acid as the monofunctional monomer. Any combination of at least two thereof may also be used. Furthermore, as the monofunctional monomer, it is possible to use any one or any combination of at least two out of the following, provided that it does not prevent the effects of the present invention: vinyl ethers such as methyl vinyl ether, ethyl vinyl ether, and isobutyl vinyl ether; vinyl ketones such as methyl vinyl ketone, hexyl vinyl ketone, and methyl isopropenyl ketone; N-vinyl compounds such as N-vinylpyrrole, N-vinylcarbazole, N-vinylindole, and N-vinylpyrrolidone; and vinylnaphthalene salts.

In the present invention, it is possible to use any one or any combination of at least two out of the above examples of the monofunctional monomer. Also, among the above examples of the monofunctional monomer, styrene, methyl methacrylate and the like are preferable as the monofunctional monomer used in the present invention because they are inexpensive.

Examples of the polyfunctional monomer include: divinylbenzene; bifunctional alkylene glycol di(meth)acrylate such as ethylene glycol di(meth)acrylate, polyethylene glycol di(meth)acrylate (having 2-10 repeating units), propylene glycol di(meth)acrylate, polypropylene glycol di(meth)acrylate (having 2-10 repeating units), 1,3-butylene glycol di(meth)acrylate, neopentyl glycol di(meth)acrylate, alkoxylated neopentyl glycol di(meth)acrylate, propoxylated neopentyl glycol di(meth)acrylate, neopentyl glycol hydroxypivalate di(meth)acrylate, and dioxane glycol di(meth)acrylate; bifunctional alkylenediol di(meth)acrylate such as butylenediol di(meth)acrylate, hexanediol di(meth)acrylate, alkoxylated hexanediol di(meth)acrylate, cyclohexanediol di(meth)acrylate, dodecanediol di(meth)acrylate, and tricyclodecanediol di(meth)acrylate; bifunctional ethoxylated bisphenol A di(meth)acrylate such as ethoxylated (having 2-10 repeating units) bisphenol A di(meth)acrylate; trifunctional trimethylolpropane tri(meth)acrylates such as trimethylolpropane tri(meth)acrylate, ethoxylated trimethylolpropane tri(meth)acrylate, pentaerythritol tri(meth)acrylate, and triacryloyloxyethyl phosphate; tetrafunctional tetra(meth)acrylate such as pentaerythritol tetra(meth)acrylate, and ditrimethylolpropane tetra(meth)acrylate; hexafunctional dipentaerythritol hexa(meth)acrylate such as dipentaerythritol hexa(meth)acrylate; octafunctional pentaerythritol (meth)acrylate such as poly(pentaerythritol) acrylate; and nitrogen atom-containing trifunctional cyclic(meth)acrylate such as ethoxylated isocyanuric acid tri(meth)acrylate. Note that in these application documents, the term "(meth)acrylate" means methacrylate or acrylate.

When the polymerizable vinyl monomer is used as the polymerizable monomer in the producing method of the present invention, it is preferable that the polymerizable vinyl monomer contain both a monofunctional monomer and a polyfunctional monomer. In this way, it is possible to form good cross-linked structures in the polymer particles and to give an excellent solvent resistance to the composite particles. The amount of the polyfunctional monomer to be used is preferably within the range from 0.5 to 50 wt % based on the total amount of the polymerizable vinyl monomer to be used, and further preferably, within the range from 1 to 40 wt %. Thus, it is possible to form more excellent cross-linked structures in the polymer particles and to give more excellent solvent resistance to the composite particles.

In the producing method of the present invention, the polymerizable vinyl monomer may be used solely as the polymerizable monomer. It is also possible to use, in accordance with the kind of the water-soluble cellulose compound described later, the polymerizable vinyl monomer together with any of the polymerizable phosphoric acid monomer represented by formulae (1) to (5) described herein below. By using such combinations of the polymerizable vinyl monomer and the polymerizable phosphoric acid monomer in accordance with the kind of the water-soluble cellulose compound described later, it is possible to improve stability of the droplets of the polymerizable monomer in an aqueous medium when the polymerizable monomer is subjected to the aqueous suspension polymerization. Thus, in the producing method of the present invention, the polymerizable phosphoric acid monomer can be suitably used together with the polymerizable vinyl monomer.

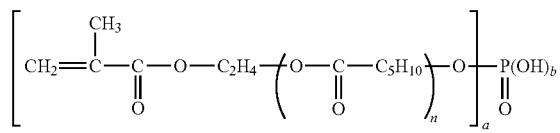

(In formula (1), n represents 1 to 5, and when a equals 1, b equals 2, while when a equals 2, b equals 1).

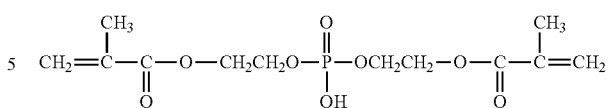

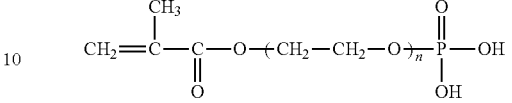

(In formula (3), n represents 1 to 5).

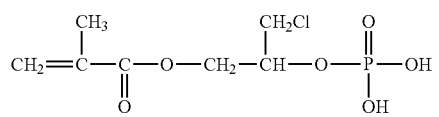

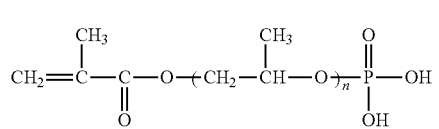

(In formula (5), n represents 1 to 6).

Specific examples of the polymerizable phosphoric acid monomer represented by the above formula (1) include "KAYAMER® PM-21" manufactured by Nippon Kayaku Co., Ltd., which is a mixture of the following at a molar ratio of 1:1: the compound represented by the above formula (1) where n=1, a=1 and b=2; and the compound represented by the above formula (1) where n=1, a=2 and b=1. Specific examples of the polymerizable phosphoric acid monomer represented by the above formula (2) include "KAYAMER® PM-2" manufactured by Nippon Kayaku Co., Ltd. and "LIGHT ESTER P-2M" manufactured by KYOEISHA CHEMICAL CO., LTD. Specific examples of the polymerizable phosphoric acid monomer represented by the above formula (3) include "KAYAMER® PM-1" (a compound represented by the above formula (3) where n=1) manufactured by Nippon Kayaku Co., Ltd., "LIGHT ESTER P-1M" (a compound represented by the above formula (3) where n=1) manufactured by KYOEISHA CHEMICAL CO., LTD, "Phosmer™ M" (a compound represented by the above formula (3) where n=1) manufactured by Uni-Chemical Co., Ltd. and "Phosmer™ PE" (a compound represented by the above formula (3) where n=4 to 5) manufactured by Uni-Chemical Co., Ltd. Specific examples of the polymerizable phosphoric acid monomer represented by the above formula (4) include "Phosmer™ CL" manufactured by Uni-Chemical Co., Ltd. Specific examples of the polymerizable phosphoric acid monomer represented by the above formula (5) include "Phosmer™ PP" (a compound represented by the above formula (5) where n=5 to 6) manufactured by Uni-Chemical Co., Ltd.

When the polymerizable phosphoric acid monomer is used together with the polymerizable vinyl monomer in the present invention, the amount of the polymerizable phosphoric acid monomer to be used preferably falls within the range from 0.01 to 1 part by weight with respect to 100 parts by weight of the polymerizable vinyl monomer, and further preferably, within the range from 0.01 to 0.8 part by weight. If the used amount of the polymerizable phosphoric acid monomer exceeds 1 part by weight with respect to 100 parts by weight of polymerizable vinyl monomer used, composite particles such as emulsified particles (by-product fine particles produced by emulsion polymerization) having an excessively small particle diameter are likely to be produced when polymerizing, which may results in a problem of increase in the coefficient of variation in the size of the composite particles.

(Aqueous Medium)

In the polymerization step in the producing method of the present invention, examples of the aqueous medium for subjecting the polymerizable monomer to the aqueous suspension polymerization include water, and a mixed medium of water and an water-soluble medium (e.g., alcohol such as methanol or ethanol). In order to stabilize the composite particles, it is preferable, generally, to use 100 to 1000 parts by weight of aqueous medium with respect to 100 parts by weight of the polymerizable monomer used.

(Polymerization Initiator)

In the polymerization step in the producing method of the present invention, it is preferable to subject the polymerizable monomer to the aqueous suspension polymerization in the presence of a polymerization initiator.

As the polymerization initiator, an oil-soluble peroxide polymerization initiator or an oil-soluble azo polymerization initiator can be suitably used, which are generally used for the aqueous suspension polymerization.

Examples of the peroxide polymerization initiator include benzoyl peroxide, lauroyl peroxide, octanoyl peroxide, ortho-chlorobenzoyl peroxide, ortho-methoxybenzoyl peroxide, methyl ethyl ketone peroxide, diisopropyl peroxydicarbonate, cumene hydroperoxide, cyclohexanone peroxide, t-butylhydroperoxide and diisopropylbenzene hydroperoxide.

Examples of the azo polymerization initiator include 2,2'-azobisisobutyronitrile, 2,2'-azobis(2,4-dimethylvaleronitrile), 2,2'-azobis(2,3-dimethylbutyronitrile), 2,2'-azobis(2-methylbutyronitrile), 2,2'-azobis(2,3,3-trimethylbutyronitrile), 2,2'-azobis(2-isopropylbutyronitrile), 1,1'-azobis(cyclohexane-1-carbonitrile), 2,2'-azobis(4-methoxy-2,4-dimethylvaleronitrile), (2-carbamoylazo)isobutyronitrile, 4,4'-azobis(4-cyanovaleric acid) and dimethyl-2,2'-azobisisobutyrate.

Among the above polymerization initiators, it is preferable, from the standpoint of decomposition rate and the like, to use 2,2'-azobisisobutyronitrile, 2,2'-azobis(2,4-dimethylvaleronitrile), benzoyl peroxide, lauroyl peroxide and the like as the polymerization initiator for the producing method in the present invention.

The amount of the polymerization initiator to be used is preferably 0.01 to 10 parts by weight with respect to 100 parts by weight of the polymerizable monomer, and is further preferably 0.1 to 5.0 parts by weight. If the used amount of the polymerization initiator is less than 0.01 part by weight with respect to 100 parts by weight of the polymerizable monomer used, the polymerization initiator hardly serves its function sufficiently. If the used amount of the polymerization initiator is more than 10 parts by weight, it is difficult to obtain effects corresponding to the used amount, which results in cost disadvantages.

(Silica Particles in State in Which Water-Soluble Cellulose Compound Adsorb onto Surfaces Thereof)

In the polymerization step in the producing method of the present invention, the polymerizable monomer is subjected to the aqueous suspension polymerization in the presence of the silica particles and the water-soluble cellulose compound adsorbing onto the surfaces of the silica particles. In the polymerization step, the silica particles, onto the surfaces of which adsorb the water-soluble cellulose compound, serve as a suspension stabilizer.

The silica particles are not particularly limited. Any known silica particles can be used. It is preferable to use the silica particles having the average primary particle diameter of 500 nm or less. If the silica particles having the average primary particle diameter of more than 500 nm are used, the amount to be added for stably performing the suspension polymerization increases, which results in cost disadvantages. Moreover, it is unfavorable because of the difficulty in stable dispersion of the polymerizable monomer. The average primary particle diameter of the silica particles is preferably as small as possible. Specifically, it is preferably in the range from 5 to 150 nm, and further preferably, in the range from 8 to 100 nm.

As the silica particles, colloidal silica can be suitably used. Examples of the colloidal silica include colloidal silica powder such as precipitated silica powder and gas phase process silica powder, and colloidal silica sol obtained by stably dispersing the silica particles in a medium up to the primary particle level. Among them, the colloidal silica sol obtained by stably dispersing the silica particles in the medium up to the primary particle level is more suitable for use in the producing method in the present invention.

As the colloidal silica sol, aqueous silica sol, organosilica sol and the like can be suitably used. In particular, since the polymerizable monomer is subjected to the aqueous suspension polymerization (i.e., an aqueous medium is used for polymerizing the polymerizable monomer) in the producing method of the present invention, it is most desirable to use the aqueous colloidal silica from the standpoint of dispersion stability of the colloidal silica sol. It is preferable to use the colloidal silica sol with the silica concentration (solid component concentration) of 5 to 50 wt %, as it is sold commercially and is easily available.

Examples of the commercial product of the colloidal silica include SNOWTEX® series manufactured by NISSAN CHEMICAL INDUSTRIES LTD., in particular, SNOWTEX® for general use, which are composed of spherical particles having the particle diameter of 5 to 100 nm (alkaline: "ST-XS"; "ST-30"; "ST-50"; "ST-30L"; and "ST-ZL", acidic: "ST-OXS"; "ST-O"; "ST-O-40"; "ST-OL" and "ST-OZL35"), SNOWTEX® composed of large spherical particles having the particle diameter of 70 to 480 nm (alkaline: "ST-MP-2040"; and "ST-MP-4540M"), chain-like shaped SNOWTEX® composed of elongated particles having the particle diameter of 40 to 100 nm (alkaline: "ST-UP", acidic: "ST-OUP"), pearl-necklace-shaped SNOWTEX® composed of coupled spherical particles having the particle diameter of 10 to 25 nm (alkaline: "ST-PS-S"; and "ST-PS-M", acidic: "ST-PS-SO" and "ST-PS-MO").

The amount of the silica particles to be used (hereinafter referred to as "additive amount") is preferably 0.022 to 0.15 g/m² per unit surface area of the composite particles obtained by the present producing method. If the additive amount of the silica particles is less than 0.022 g/m², the silica particles may insufficiently adhere to the surfaces of the polymer particles in the composite particles. If the additive amount of the silica particles is more than 0.15 g/m², it is difficult to obtain effects corresponding to the additive amount, which results in cost disadvantages.

The water-soluble cellulose compound that adsorb onto the silica particles are not particularly limited. Examples thereof include compounds: alkyl celluloses such as methyl cellulose; hydroxyalkyl celluloses such as hydroxymethyl cellulose, hydroxyethyl cellulose, and hydroxypropyl cellulose; and hydroxyalkyl alkylcelluloses such as hydroxyethyl methylcellulose, and hydroxypropyl methylcellulose. Among the above compounds, it is preferable to use at least one of the hydroxyalkyl celluloses and hydroxyalkyl alkylcelluloses, specifically, at least one of hydroxypropyl cellulose (HPC) and hydroxypropyl methylcellulose (HPMC). Also, the above compounds may be used singularly or as a combination of at least two of them.

It is generally known that hydroxypropyl cellulose (HPC) has the lower critical solution temperature (LCST) of 45° C. Examples of the commercial product include NISSO® HPC series (e.g., "SSL", "SL", "L", "M" and "H") manufactured by NIPPON SODA CO., LTD.

Examples of the commercial product of hydroxypropyl methylcellulose (HPMC) include Metolose® series manufactured by Shin-Etsu Chemical Co., Ltd., in particular, Metolose® 60SH series having the cloud point of 60° C. ("60SH-50", "60SH-4000" and "60SH-10000"), Metolose® 65SH series having the cloud point of 65° C. ("65SH-50", "65-SH-400", "65SH-1500" and "65SH-4000"), and Metolose® 90SH series having the cloud point of 90° C. ("90SH-100", "90SH-400", "90SH-4000" and "90SH-15000").

The adsorption amount of the water-soluble cellulose compound onto the silica particles is not particularly limited. It may be suitably set according to the specific surface area of the silica particle used in the present invention. Preferably, the adsorption amount is 0.05 to 0.5 g per 1 g of the silica particles.

The adsorption amount of the water-soluble cellulose compound onto the silica particles can be measured, for example, by a method described in "KOBUNSHI RONBUNSHU" (Japanese Journal of Polymer Science and Technology), Vol. 40, No. 10, pp. 697-702 (October, 1983), issued by The Society of Polymer Science, Japan. Specifically, it can be measured by [Method for Measuring Adsorption Amount of Water-Soluble Cellulose Compound onto Silica Particles] described later in Examples.

The producing method of the present invention preferably includes, before the polymerization step, an adsorption step in which the silica particles are treated with the water-soluble cellulose compound so that the water-soluble cellulose compound is adsorbed onto the surfaces of the silica particles.

The method for treating the silica particles with the water-soluble cellulose compound so that the water-soluble cellulose compound adsorb onto the surfaces of the silica particles is not particularly limited, thus the known methods can be applied. For example, the following method is preferable: physically adsorbing the water-soluble cellulose compound onto the surfaces of the silica particles by making the silica particles coexist with the water-soluble cellulose compound in an aqueous medium (specifically, the method described in the document "Rheological and Interfacial Properties of Silicone Oil Emulsions Prepared by Polymer Pre-adsorbed onto Silica Particles", which appears in Colloids Surfaces A: Physicochem. Eng. Aspects, Vol. 328, pp. 114-122, 2008). The water-soluble cellulose compound that adsorb onto the silica particles by this method are in a stable state and hardly desorb from the silica particles in the polymerization step.

It is possible to physically adsorb the water-soluble cellulose compound physically onto the surfaces of the silica particles more effectively by making the silica particles coexist with the water-soluble cellulose compound under the temperature condition where the water-soluble cellulose compound has the temperature of (T−15) ° C. or more (where T represents the lower critical solution temperature (° C.) or the cloud point (° C.) of the water-soluble cellulose compound), further preferably, the water-soluble cellulose compound has the temperature of (T−15) ° C. or more and (T+20) ° C. or less. The water-soluble cellulose compound has, depending on its properties, either the lower critical solution temperature or the cloud point.

The water-soluble cellulose compound that have not adsorbed onto the silica particles in the adsorption step may be removed by centrifugation and the like before the polymerization step, or may be removed by washing, after the polymerization step, in the purification step of purifying the composite particles obtained in the polymerization step.

In the polymerization step in the producing method of the present invention, a suspension stabilizer other than the silica particles may be further used unless it prevents the effect of enhanced suspension stability of the silica particles onto which the water-soluble cellulose compound adsorb.

(Surfactant)

In the polymerization step in the producing method of the present invention, the polymerizable monomer may be subjected to the aqueous suspension polymerization in the presence of a surfactant in order to further improve the suspension stability. As the surfactant, any of the following may be used: an anionic surfactant; a cationic surfactant; an ampholytic surfactant; and a nonionic surfactant.

Examples of the anionic surfactant include: sodium oleate; fatty acid soap such as castor oil potash soap; alkyl sulfate ester salt such as sodium lauryl sulfate and ammonium lauryl sulfate; alkylbenzenesulfonate salt such as sodium dodecylbenzenesulfonate; alkylnaphthalenesulfonate salt; alkanesulfonate salt; dialkyl sulfosuccinate salt; alkyl phosphate ester salt; naphthalenesulfonic acid formalin condensate; polyoxyethylene alkylphenyl ether sulfate ester salt; and polyoxyethylene alkyl sulfate ester salt.

Examples of the nonionic surfactant include: polyoxyethylene alkyl ether, polyoxyethylene alkyl phenyl ether, polyoxyethylene fatty acid ester, sorbitan fatty acid ester, polyoxy sorbitan fatty acid ester, polyoxyethylene alkyl amine, glycerin fatty acid ester, and oxyethylene-oxypropylene block polymer.

Examples of the cationic surfactant include: alkyl amine salt such as laurylamine acetate, and stearylamine acetate; and quaternary ammonium salt such as lauryl trimethyl ammonium chloride.

Examples of the ampholytic surfactant include: lauryldimethylamine oxide; phosphate ester surfactant; and phosphite ester surfactant.

The above surfactants may be used singularly or as a combination of at least two of them. The kind and the amount to be used of the surfactant are suitably selected and adjusted in consideration of the particle diameter of the composite particles to be obtained and the dispersion stability of the polymerizable monomer at the time of the aqueous suspension polymerization.

(Polymerization Inhibitor)

In the polymerization step in the producing method of the present invention, the polymerizable monomer may be subjected to the aqueous suspension polymerization in the presence of a water-soluble polymerization inhibitor in order to suppress generation of emulsified particles in aqueous system.

Examples of the water-soluble polymerization inhibitor include: nitrites; sulfites; hydroquinones; ascorbic acids; water-soluble vitamins B; citric acid; and polyphenols.

(Other Additives)

In the polymerization step in the producing method of the present invention, the polymerizable monomer may be subjected to the aqueous suspension polymerization in the presence of other additives such as a pigment, a dye, an antioxidant and an ultraviolet absorber, unless they prevent the effects of the present invention.

Examples of the pigment includes: inorganic pigments such as white lead, red lead, chrome yellow, carbon black, ultramarine, zinc oxide, cobalt oxide, titanium dioxide, iron oxide, titan yellow, and titan black; yellow pigments such as Naples yellow, naphtol yellow S, Hanza yellow 10G, benzidine yellow G, benzidine yellow GR, quinoline yellow lake, permanent yellow NCG, and tartrazine lake; orange pigments such as molybdate orange, permanent orange RK, benzidine orange G, and indanthrene brilliant orange OK; red pigments such as permanent red 4R, lithol red, pyrazolone, red 4R, watching red calcium salt, lake red D, brilliant carmine 6B, eosin lake, rhodamine lake B, alizarin lake, and brilliant carmine B; purple pigments such as fast violet B, methyl violet lake, and dioxane violet; blue pigments such as alkali blue lake, victoria blue lake, phthalocyanine blue, metal-free phthalocyanine blue, partial chloride phthalocyanine blue, fast sky blue, and indanthrene blue BC; green pigments such as pigment green B, malachite green lake, and final yellow green G; and organic pigments such as isoindolinone pigment, quinacridone pigment, perinone pigment, perylene pigment, insoluble azo pigment, soluble azo pigment, and lake pigment.

Examples of the dye include: nitroso dye, nitro dye, azo dye, stilbene azo dye, diphenylmethane dye, triphenylmethane dye, xanthene dye, acridine dye, quinoline dye, methine dye, polymethine dye, thiazole dye, indamine dye, indophenol dye, azine dye, oxazine dye, thiazine dye, and sulphur dye.

Examples of the antioxidant include: phenol antioxidants such as 2,6-di-t-butyl-4-methylphenol (BHT), n-octadecyl-3'-(3',5'-di-t-butyl-4'-hydroxyphenyl)propionate, pentaerythrityl tetrakis[3-(3,5-di-t-butyl-4-hydroxyphenyl)propionate], 1,3,5-tris(3,5-di-tert-butyl-4-hydroxybenzyl) isocyanurate, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5,5]undecane; phosphorus antioxidants such as distearyl pentaerythritol diophosphite, tris(2,4-di-t-butylphenyl) phosphite, bis(2,4-di-t-butylphenyl) pentaerythritol diphosphite, tetrakis(2,4-di-t-butylphenyl) 4,4'-biphenylene diphosphonite, bis(2-t-butyl-4-methylphenyl) pentaerythritol diphosphite, 2,4,8,10-tetra-t-butyl-6-[3-(3-methyl-4-hydroxy-5-t-butylphenyl)propxy]dibenzo[d, f][1, 3,2]dioxaphosphepin; and amine antioxidants such as phenyl-1-naphthylamine, octylated diphenylamine, 4,4-bis(α, α-dimethylbenzyl)diphenylamine, and N,N'-di-2-naphthyl-p-phenylenediamine.

Examples of the ultraviolet absorber include benzophenone ultraviolet absorber, benzotriazole ultraviolet absorber (e.g., "ADK STAB® LA-31" manufactured by ADEKA CORPORATION), and hydroxyphenyl triazine ultraviolet absorber.

(Suspension Polymerization Method)

In the polymerization step in the producing method of the present invention, the polymerizable monomer is subjected to the aqueous suspension polymerization in the presence of the silica particles and the water-soluble cellulose compound adsorbing onto the surfaces of the silica particles. For example, in the polymerization step, a monomer mixture is prepared by mixing, with the polymerizable monomer, the polymerization initiator and/or the polymerization inhibitor and/or other additives, if needed, then the prepared monomer mixture is dispersed in an aqueous medium including the silica particles and the water-soluble cellulose compound adsorbing onto the surfaces of the silica particles (the aqueous medium may further include, if needed, the surfactant and/or other suspension stabilizers), thus the aqueous suspension polymerization is performed.

As the method for dispersing the monomer mixture in the aqueous medium, for example, the following can be suitably used: a method in which the monomer mixture is directly added to the aqueous medium and then dispersed as monomer droplets by stirring force of propeller blades and the like; a method in which the monomer mixture is directly added to the aqueous medium and then dispersed in the aqueous medium using a homomixer as a disperser that generates a high shear force by a rotor and a stator; a method in which the monomer mixture is directly added to the aqueous medium and then dispersed in the aqueous medium using an ultrasonic disperser; a method in which the monomer mixture is directly added to the aqueous medium and then dispersed as droplets in the aqueous medium by causing collisions between the droplets of the monomer mixture or collisions of the droplets of the monomer mixture against an inner wall of a reaction container using a high-pressure disperser such as Microfluidizer or Nanomizer; and a method in which the monomer mixture is pressed into the aqueous medium through a MPG (micro porous glass) porous membrane. Among the above methods, the method using the high-pressure disperser such as the Microfluidizer or the Nanomizer or the method in which the monomer mixture passes through the MPG (micro porous glass) porous membrane can be suitably used as the method for dispersing the monomer mixture in the aqueous medium because the particle diameter can be more uniform by those methods than by the other methods.

Then, the aqueous medium in which the monomer mixture is dispersed (i.e., aqueous suspension) is heated so as to start the suspension polymerization. During the polymerization reaction, it is preferable to stir the aqueous suspension. The stirring may be performed to the extent of, for example, preventing the monomer mixture from surfacing as droplets, or preventing the composite particles produced by the polymerization from settling out.

In the suspension polymerization, the polymerization temperature is preferably set in the range from 30 to 120° C., and further preferably, in the range from 40 to 80° C. The period of time for maintaining the polymerization temperature is preferably in the range from 0.1 to 20 hours.

After completion of the polymerization, the obtained composite particles are separated as hydrous cake by the methods such as suction filtration, centrifugal dehydration, centrifugal separation and pressure dehydration. The hydrous cake is further washed by water and dried, as needed, thus the desired composite particles can be obtained.

The size and the shape of the composite particles of the present invention are not particularly limited. However, by the above method for producing the composite particles, it is possible to obtain the composite particles having the volume average particle diameter of 1 to 100 μm.

The average particle diameter of the obtained composite particles can be adjusted by adjusting: the mixing condition of the monomer mixture and the aqueous medium; the respective additive amounts of other suspension stabilizers, surfactants and the like; the stirring condition of the stirrer; and the dispersion condition.

In the above method for producing the composite particles, the polymerizable monomer is subjected to the aqueous suspension polymerization in the presence of the silica particles and the water-soluble cellulose compound adsorbing onto the surfaces of the silica particles, which allows the silica particles to strongly adhere to the surfaces of the polymer particles due to the function of the water-soluble cellulose compound adsorbing onto the surfaces of the silica particles. For this reason, it is possible to obtain the composite particles in which the silica particles hardly fall off the surface of the polymer particles.

[Composite Particles]

In the above method for producing the composite particles, it is possible to obtain the composite particles of the present invention in which the silica particles adhere to the surfaces of the polymer particles (a polymer of the polymerizable monomer). That is, as shown in the TEM (transmission electron microscope) images of FIGS. 1 and 2, it is possible to obtain the composite particle in which at least part of the polymer particle is covered by a layer of the silica particles (see the black part of FIGS. 1 and 2).

Specifically, the composite particles of the present invention include the polymer particles, the silica particles that adhere to the surfaces of the polymer particles and the water-soluble cellulose compound.

In the composite particles of the present invention, the silica particles may adhere to the surfaces of the polymer particles via the water-soluble cellulose compound, or may adhere directly to the surfaces of the polymer particles. In other words, in the composite particles of the present invention, the water-soluble cellulose compound may adhere to both of the silica particles and the polymer particles, or may adhere to either the silica particles or the polymer particles.

In the composite particles of the present invention, the adhesion amount of the silica particles to the surfaces of the polymer particles is not particularly limited. However, preferably it falls within the range from 0.010 to 0.10 $g/m^2$ per unit surface area of the composite particles. When the adhesion amount of the silica particles to the surfaces of the polymer particles is 0.010 to 0.10 $g/m^2$ per unit surface area of the composite particles, it is possible to sufficiently obtain the characteristics of the composite particles in which the silica particles adhere to the polymer particles. The adhesion amount of the silica particles to the surface of the polymer particle ($g/m^2$) in the composite particle can be obtained, for example, by [Calculation Method of Adhesion Amount] described later in Examples.

In the above-described composite particles of the present invention, the silica particles strongly adhere to the surfaces of the polymer particles because of the water-soluble cellulose compound being contained, thus, the silica particles hardly fall off the surfaces of the polymer particles.

[External Preparation]

The composite particles of the present invention can be contained in an external preparation as an additive for improving the use feeling such as lubricity when applying, or as an additive for obscuring skin defects such as pores, freckles and wrinkles by a light diffusion effect. The external preparation of the present invention contains the composite particles of the present invention.

The amount of the composite particles contained in the external preparation of the present invention can be suitably set according to the kind of the external preparation. However, the contained amount is preferably in the range from 1 to 80 wt %, and further preferably, in the range from 3 to 70 wt %. When the content of the composite particles is less than 1 wt % with respect to the total amount of the external preparation, the specific effect due to the contained composite particles may not be seen. When the content of the composite particles is more than 80 wt %, the remarkable effect corresponding to increase of the content may not be seen, thus it is unfavorable from the standpoint of the producing costs.

The external preparation of the present invention can be used as, for example, medicines for external use and cosmetics. The kind of the medicine for external use is not particularly limited, provided that it is applied to the skin. Specific examples thereof include cream, ointment and emulsion. Examples of the cosmetics include: cleaning cosmetics such as soap, body shampoo, cleansing cream, facial scrub, and toothpaste; make-up cosmetics such as make-up powder, face powder (loose powder, pressed powder and the like), foundation (powder foundation, liquid foundation, emulsion foundation and the like), lipstick, lip cream, cheek color, preparations for eyes and brows (eyeshadow, eyeliner, mascara and the like), and manicure; lotion such as pre-shave lotion, and body lotion; external preparations for body such as body powder, and baby powder; skin care preparations such as lotion, cream, and milk (cosmetic milk); antiperspirant (liquid antiperspirant, solid antiperspirant, cream antiperspirant and the like); facial masks; hair washing preparations; hair dye, hair styling preparations, aromatic cosmetics; bath preparations; sunscreen preparations; suntan preparations; and shaving cream.

The composite particles to be contained in the external preparation of the present invention may be treated with oil, a surface treatment agent such as a silicone compound and a fluorine compound, organic powder and inorganic powder.

As the oil, any oil that is generally used for the external preparation may be used. Examples of the oil include: hydrocarbon oil such as liquid paraffin, squalane, vaseline, and paraffin wax; higher fatty acid such as lauric acid, myristic acid, palmitic acid, stearic acid, oleic acid, behenic acid, undecylenic acid, oxystearic acid, linoleic acid, lanolin fatty acid, and synthetic fatty acid; estel oil such as glyceryl trioctanoate, propyleneglycol dicaprylate, cetyl 2-ethylhexanoate, and isocetyl stearate; waxes such as beeswax, whale wax, lanolin, carnauba wax, and candelilla wax; oils and fats such as linseed oil, cottonseed oil, castor oil, egg-yolk oil, and coconut oil; metal soaps such as zinc stearate, and zinc laurate; higher alcohols such as cetyl alcohol, stearyl alcohol, and oleyl alcohol. The method for treating the composite particles with the oil is not particularly limited. For example, the following methods can be used: a dry method in which the oil is added to the composite particles and the mixture is stirred by a mixer and the like so that the oil coats the composite particles; and a wet method in which the oil is heated and dissolved in a suitable solvent such as ethanol, propanol, ethyl acetate or hexane, the composite particles are added to the above solution and are stirred and mixed, then the solvent is removed under the reduced pressure or by heating, so that the oil coats the composite particles.

As the silicone compound, any silicone compound that is generally used for the external preparation may be used. Examples of the silicone compound include: dimethylpolysiloxane, methylhydrogenpolysiloxane, methylphenylpolysiloxane, acrylic silicone graft polymner, organic silicone resin, and partially crosslinked organopolysiloxane polymer. The method for treating the composite particles with the silicone compound is not particularly limited. For example, the above dry method and wet method can be used. Also, the baking treatment may be additionally performed, if needed.

In the case that the silicone compound is reactive, a catalyst and the like may be appropriately added.

As the fluorine compound, any fluorine compound that is generally used for the external preparation may be used. Examples of the fluorine compound include ester containing perfluoroalkyl groups, perfluoroalkylsilane, perfluoropolyether, and polymer containing perfluoro groups. The method for treating the composite particles with the fluorine compound also is not particularly limited. For example, the above dry method and wet method can be used. Also, the baking treatment may be additionally performed, if needed. In the case that the fluorine compound is reactive, a catalyst and the like may be appropriately added.

Examples of the organic powder include: natural polymer compound such as gum arabic, gum tragacanth, guar gum, locust bean gum, karaya gum, iris moss, quince seed, gelatin, shellac, rosin, and casein; semisynthetic polymer compound such as sodium carboxymethyl cellulose, hydroxyethyl cellulose, methyl cellulose, ethyl cellulose, sodium alginate, gum ester, nitro cellulose, hydroxypropyl cellulose, and crystalline cellulose; and resin particles such as polyvinyl alcohol, polyvinyl pyrrolidone, sodium polyacrylate, carboxyvinyl polymer, polyvinyl methyl ether, polyamide resin, silicone oil, nylon particles, polymethyl methacrylate particles, crosslinked polystyrene particles, silicone particles, urethane particles, polyethylene particles, and fluororesin particles. Examples of the inorganic powder include iron oxide, ultramarine, iron blue, chromium oxide, chromium hydroxide, carbon black, manganese violet, titanium oxide, zinc oxide, talc, kaolin, mica, calcium carbonate, magnesium carbonate, aluminum silicate, barium silicate, calcium silicate, magnesium silicate, silica, zeolite, barium sulfate, firing calcium sulfate (calcinated plaster), calcium phosphate, hydroxyapatite, and ceramic powder. These organic powder and inorganic powder may be subjected to the surface treatment previously. As the surface treatment, publicly known treatments as described above may be used.

Also, the external preparation of the present invention can contain, depending on its purpose, a main agent or an additive generally used, provided that it does not prevent the effects of the present invention. Examples of the main agent or the additive include water, lower alcohol (alcohol having a carbon number of not more than 5), fats and waxes, hydrocarbon, higher fatty acid, higher alcohol, sterol, fatty acid ester, metal soap, moisturizer, surfactant, polymer compound, color material, perfume, clay and minerals, preservative, germicide, anti-inflammatory agent, antioxidant, ultraviolet absorber, organic or inorganic composite particles, PH adjuster (triethanol amine and the like), special additive, and active ingredient of medicine.

Specific examples of the fats and waxes include avocado oil, almond oil, olive oil, cocoa butter, beef tallow, sesame oil, wheat germ oil, safflower oil, shea butter, turtle oil, *camellia* oil, persic oil, castor oil, grape oil, macadamia nut oil, mink oil, egg-yolk oil, Japan wax, coconut oil, rose hip oil, hydrogenated oil, silicone oil, orange roughy oil, carnauba wax, candelilla wax, whale wax, jojoba oil, montan wax, beeswax, and lanolin.

Specific examples of the hydrocarbon include liquid paraffin, vaseline, paraffin, ceresine, micro crystalline wax, and squalane.

Specific examples of the higher fatty acid include fatty acid having a carbon number of not less than 11 such as lauric acid, myristic acid, palmitic acid, stearic acid, oleic acid, behenic acid, undecylenic acid, oxystearic acid, linoleic acid, lanolin fatty acid, and synthetic fatty acid.

Specific examples of the higher alcohol include alcohol having a carbon number of not less than 6 such as lauryl alcohol, cetyl alcohol, cetostearyl alcohol, stearyl alcohol, oleyl alcohol, behenyl alcohol, lanolin alcohol, hydrogenated lanolin alcohol, hexyldecanol, octyldecanol, isostearyl alcohol, jojoba alcohol, and decyl tetradecanol.

Specific examples of the sterol include cholesterol, dihydrocholesterol, and phytocholesterol.

Specific examples of fatty acid ester include: linoleic acid ester such as ethyl linolate; lanolin fatty acid ester such as lanolin fatty acid isopropyl; lauric acid ester such as hexyl laurate; myristic acid ester such as isopropyl myristate, myristyl myristate, cetyl myristate, octyldecyl myristate, and octyldodecyl myristate; oleic acid ester such as decyl oleate, and octyldodecyl oleate; dimethyl octane acid ester such as hexyldecyl dimethyl octanoate; isooctane acid ester such as cetyl isooctanoate (cetyl 2-ethyl hexanoate); palmitic acid ester such as decyl palmitate; cyclic alcohol fatty acid ester such as glycerin trimyristate, glycerin tri(caprylate or caprate), propylene glycol dioleate, glycerin triisostearate, glycerin triisooctanoate, cetyl lactate, myristyl lactate, diisostearyl malate, cholesteryl isostearate, and cholesteryl 12-hydroxystearate.

Specific examples of the metal soap include zinc laurate, zinc myristate, magnesium myristate, zinc palmitate, zinc stearate, aluminium stearate, calcium stearate, magnesium stearate, and zinc undecylenate.

Specific examples of the moisturizer include glycerin, propylene glycol, 1,3-butylene glycol, polyethylene glycol, sodium dl-pyrrolidone carboxylate, sodium lactate, sorbitol, sodium hyaluronate, polyglycerol, xylite, and maltitol.

Specific examples of the surfactant include: anionic surfactants such as higher fatty acid soap, higher alcohol sulfuric acid ester, N-acyl glutamine acid salt, and phosphoric acid ester salt; cationic surfactants such as amino acid, and quaternaty ammonium salt; ampholytic surfactants such as betaine type, amino acid type, imidazoline type and lecithin; and nonionic surfactants such as fatty acid monoglyceride, polyethylene glycol, propylene glycol fatty acid ester, sorbitan fatty acid ester (e.g., sorbitan isostearate), sucrose fatty acid ester, polyglycerol fatty acid ester, and ethylene oxide condensate.

Specific examples of the polymer compound include: natural polymer compound such as gum arabic, gum tragacanth, guar gum, locust bean gum, karaya gum, iris moss, quince seed, gelatin, shellac, rosin, and casein; semisynthetic polymer compound such as sodium carboxymethyl cellulose, hydroxyethyl cellulose, methyl cellulose, ethyl cellulose, sodium alginate, gum ester, nitro cellulose, hydroxypropyl cellulose, and crystalline cellulose; and synthetic polymer compound such as resin particles including polyvinyl alcohol, polyvinyl pyrrolidone, sodium polyacrylate, carboxyvinyl polymer, polyvinyl methyl ether, polyamide resin, silicone oil, nylon particles, poly(meth)acrylic acid ester particles (e.g., polymethyl methacrylate particles), polystyrene particles, silicone particles, urethane particles, and polyethylene particles. Note that in these application documents, the term "(meth)acrylic" means methacrylic or acrylic.

Specific examples of the color material include: inorganic pigments such as iron oxide (e.g., red iron oxide, yellow iron oxide and black iron oxide), ultramarine, iron blue, chromium oxide, chromium hydroxide, carbon black, manganese violet, titanium oxide, zinc oxide, talc, kaolin, calcium carbonate, magnesium carbonate, mica, aluminum silicate, barium silicate, calcium silicate, magnesium silicate, silica, zeolite, barium sulfate, firing calcium sulfate (calcinated plaster), calcium phosphate, hydroxyapatite, and ceramic powder; and tar dyes such as azo dye, nitro dye, nitroso dye, xanthene dye, quinoline dye, anthraquinoline dye, indigo dye, triphenylmethane dye, phthalocyanine dye, and pyrene dye.

The powder materials for the polymer compound or for the color material may be subjected to the surface treatment previously. As the surface treatment, publicly known treatments may be used. Examples of the treatments include: an oil treatment using hydrocarbon oil, ester oil, lanolin or the like; a silicone treatment using dimethylpolysiloxane, methylhydrogenpolysiloxane, methylphenylpolysiloxane or the like; a fluorine compound treatment using polymers and the like having ester containing perfluoroalkyl groups, perfluoroalkylsilane, perfluoropolyether and perfluoroalkyl groups, a silane coupling agent treatment using 3-methacryloxypropyl trimethoxysilane, 3-glycidoxypropyl trimethoxysilane or the like; a titanium coupling treatment using isopropyl triisostearoyl titanate, isopropyltris (dioctylpyrophosphate) titanate or the like; a metal soap treatment; an amino acid treatment using acyl glutamic acid or the like; a lecithin treatment using hydrogenated egg-yolk lecithin or the like; a collagen treatment; a polyethylene treatment; a moisturizing treatment; an inorganic compound treatment; and a mechanochemical treatment.

Specific examples of the clay and minerals include: components having several functions such as extender pigment and adsorbent, i.e., talc, mica, sericite, titanium sericite (sericite coated with titanium oxide), moscovite, and VEEGUM® manufactured by R. T. Vanderbilt Company, Inc.

Specific examples of the perfume include anisaldehyde, benzyl acetate and geraniol. Specific examples of the preservative and germicide include methylparaben, ethylparaben, propylparaben, benzalkonium, and benzethonium. Specific examples of the antioxidant include dibutylhydroxytoluene, butylhydroxyanisole, propyl gallate, and tocopherol. Specific examples of the anti-inflammatory agent include ε-aminocaproic acid, glycyrrhizic acid, dipotassium glycyrrhizinate, ß-glycyrrhetic acid, lysozyme chloride, guaiazulene, and hydrocortisone. These may be used singularly, or as a combination of at least two of them. Specific examples of the ultraviolet absorber include: inorganic absorbers such as titanium oxide fine particles, zinc oxide fine particles, cerium oxide fine particles, iron oxide fine particles, and zirconium oxide fine particles; and organic absorbers based on such as benzoic acid, para-aminobenzoic acid, anthranilic acid, salicylic acid, cinnamic acid, benzophenone, and dibenzoyl methane.

Specific examples of the special additive include hormones such as estradiol, estrone, ethinyl estradiol, cortisone, hydrocortisone, and predonisone; vitamins such as vitamin A, vitamin B, vitamin C, and vitamin E; skin astringents such as citric acid, tartaric acid, lactic acid, aluminium chloride, aluminium sulfate, potassium sulfate, aluminium chlorohydroxy allantoinate, zinc para-phenolsulfonate, and zinc sulfate; hair growth promoting agents such as cantharis tincture, *capsicum* tincture, ginger tincture, swertia *japonica* extract, garlic extract, hinokitiol, carpronium chloride, pentadecanoic acid glyceride, vitamin E, estrogen, and photosensitive element; whitening agents such as magnesium L-ascorbyl phosphate, and kojic acid.

The external preparation of the present invention has good lubricity because it contains the composite particles of the present invention. Also, when the external preparation contains an aqueous solvent, it is possible to obtain a good dispersibility of the composite particles due to hydrophilicity of the silica particles that adhere to the surfaces of the polymer particles.

[Coating Agent]

The composite particles of the present invention can be contained in the coating agent as a coating film softening agent, a flatting agent for coating material, a light diffusing agent and the like. The coating agent of the present invention contains the composite particles of the present invention.

The coating agent contains, as needed, a binder resin. As the binder resin, it is possible to use a resin soluble in the organic solvent or the water, or a emulsion-type waterborne resin dispersible in the water. Any known binder resins may be used. Examples of the binder resins include: acrylic resins such as trade names: "Dianal® LR-102" and "Dianal® BR-106" both manufactured by MITSUBISHI RAYON CO., LTD., and trade name: "Medium VM" manufactured by Dainichiseika Color & Chemicals Mfg. Co., Ltd.; an alkyd resin; a polyester resin; a polyurethane resin; a chlorinated polyolefin resin; an amorphous polyolefin resin; and a silicone resin. These binder resins may be suitably selected in consideration of the adhesiveness of the coating agent to a base material to be coated, or in consideration of the usage environment.

The amount of the composite particles to be contained is suitably adjusted in consideration of the thickness of the coating film formed by the coating agent containing the binder resin, the average particle diameter of the composite particles, the coating method, the intended use and the like. Preferably, the amount is in the range from 1 to 300 parts by weight with respect to 100 parts by weight of the binder resin, and further preferably, in the range from 5 to 100 parts by weight. When the amount of the composite particles is less than 1 part by weight with respect to 100 parts by weight of the binder resin, the flatting effect may not be sufficiently obtained. When the amount of the composite particles is more than 300 parts by weight with respect to 100 parts by weight of the binder resin, the composite particles may not be sufficiently dispersed because of the excess viscosity of the coating agent, which results in the poor appearance of the surface of the coating film, for example, microcracks or the roughness of the surface of the coating film coated with the coating agent.

The coating agent contains, as needed, a medium. As the medium, it is preferable to use a solvent that can dissolve the binder resin or a dispersion medium that can disperse the binder resin. As the dispersion medium or the solvent, it is possible to use both an aqueous medium and an oily medium. Examples of the oily media include: hydrocarbon solvents such as toluene, xylene, and cyclohexane; ketone solvents such as methyl ethyl ketone, and methyl isobutyl ketone; ester solvents such as ethyl acetate, and butyl acetate; and ether solvents such as dioxane, ethylene glycol diethyl ether, and ethylene glycol monobutyl ether. Examples of the aqueous media include water, and alcohols (for example, isopropanol). These media may be used singularly or as a combination of at least two of them. The amount of the medium to be contained in the coating agent is generally in the range from 20 to 60 wt % based on the total amount of the coating agent.

Furthermore, the coating agent may contain other additives such as a curing agent, a colorant (e.g., extender pigment, coloring pigment, metallic pigment, mica pigment powder, and dye), an antistatic agent, a leveling agent, a fluidity modifier, an ultraviolet absorber, and a light stabilizer.

The base material to be coated with the coating agent is not particularly limited. It may be selected according to the intended use.

For example, for optical use, a glass base material, a transparent base material constituted by a transparent base resin or the like is used as a base material to be coated. It is possible to produce an optical film such as a light diffusion film or an antiglare film by using a transparent base material as the base material to be coated, and by coating the transparent base material with the coating agent not containing the colorant (i.e., coating agent for light diffusion) so as to form a transparent coating film. In this case, the composite particles serve as a light diffusing agent.

Also, when paper is used as the base material to be coated, it is possible to produce matte paper by coating the paper with the coating agent not containing the colorant (i.e. coating agent for paper) so as to form the transparent coating film.

The coating method with the coating agent is not particularly limited. Any known methods may be used. Examples of the coating methods include a comma direct method, a spin coating method, a spray coating method, a roll coating method, a dipping method, a knife coating method, a curtain flow method, and a laminating method. The coating agent may be diluted with a diluent as needed in order to adjust the viscosity. Examples of the diluents include: hydrocarbon solvents such as toluene, and xylene; ketone solvents such as methyl ethyl ketone, and methyl isobutyl ketone; ester solvents such as ethyl acetate, and butyl acetate; ether solvents such as dioxane, and ethylene glycol diethyl ether; water; and alcohol solvents. The above diluents may be used singularly or as a combination of at least two of them. When producing the optical film, it is preferable to use the coating method in which unevenness derived from the composite particles is formed on the surface of the coating film.

Since the above-described coating agent of the present invention contains the composite particles of the present invention, it is possible to give the light diffusibility to the coating film formed by the coating agent. Also, in the coating agent, the hardness of the composite particles is ensured by the silica particles that adhere to the surfaces of the polymer particles. Thus, the improvement in the scratch resistance of the coating film formed by the coating agent can be expected. Furthermore, when the coating agent contains the aqueous solvent, it is possible to obtain an excellent dispersibility of the composite particles due to the hydrophilicity of the silica particles that adhere to the surfaces of the polymer particles.

[Optical Film]

The optical film of the present invention is obtainable by coating a film-like base material with the coating agent of the present invention. Specific examples of the optical films include a light diffusion film, and an antiglare film.

Specific examples of the base material of the optical film include a glass base material, and a transparent base material made of a transparent base resin.

Examples of the transparent base resins include: an acrylic resin such as polymethyl methacrylate; alkyl (meth) acrylate-styrene copolymer; polycarbonate; polyester such as polyethylene terephthalate (hereinafter referred to as "PET"); polyethylene; polypropylene; and polystyrene. Among the above transparent base resins, when an excellent transparency is required of the transparent base resin, it is preferable to use the acrylic resin, alkyl (meth)acrylate-styrene copolymer, polycarbonate, polyester or polystyrene. These transparent base resins may be used singularly or as a combination of at least two of them.

Also, in the optical film, the thickness of the coating film obtainable by applying the coating agent is preferably in the range from 5 to 100 μm.

[Resin Composition]

The resin composition of the present invention contains the composite particles and the base resin of the present invention. Since the resin composition of the present invention contains the composite particles of the present invention and is excellent in light diffusibility, it can be used as a material of a lighting cover (lighting cover for light emitting diode (LED) lighting, lighting cover for fluorescent lighting and the like), and a material for light diffusers such as a light diffusion sheet and a light diffusion plate.

As the base resin, generally a thermoplastic resin is used, which is different from the polymer components contained in the composite particles. Examples of the thermoplastic resins used as the base resin include an acrylic resin, alkyl (meth)acrylate-styrene copolymer, polycarbonate, polyester, polyethylene, polypropylene, and polystyrene. Among these thermoplastic resins, when an excellent transparency is required of the base resin, it is preferable to use the acrylic resin, alkyl (meth)acrylate-styrene copolymer, polycarbonate, polyester or polystyrene. These thermoplastic resins may be used singularly or as a combination of at least two of them.

The addition rate of the composite particles to the base resin is preferably in the range from 0.1 to 70 parts by weight with respect to 100 parts by weight of the base resin, and further preferably, in the range from 1 to 50 parts by weight. When the addition rate of the composite particles to the base resin is less than 0.1 part by weight with respect to 100 parts by weight of the base resin, the light diffuser may not have the sufficient light diffusibility. When the addition rate of the composite particles to the base resin is more than 70 parts by weight with respect to 100 parts by weight of the base resin, the optical transparency of the light diffuser may be reduced while the light diffuser obtains the light diffusibility.

The method for producing the resin composition is not particularly limited. It can be produced by mixing the composite particles and the base resin using a conventionally known method such as a mechanical pulverizing and mixing method. In the mechanical pulverizing and mixing method, the resin composition can be produced by mixing and stirring the composite particles and the base resin using, for example, a mixer such as a Henschel mixer, a V-type mixer, a Turbula mixer, a Hybridizer, or a Rocking mixer.

[Molded Product]

The molded product of the present invention is obtainable by molding the resin composition of the present invention. Specific examples of the molded products of the present invention include a lighting cover (lighting cover for light emitting diode (LED) lighting, lighting cover for fluorescent lighting and the like), and light diffusers such as a light diffusion sheet and a light diffusion plate.

For example, the composite particles and the base resin are mixed by the mixer. The mixture is kneaded by a melt-kneader such as an extruder so as to obtain a pellet constituted by the resin composition. Then, the pellet is subjected to extrusion molding or it is melted and subjected to injection molding. Thus, the molded product in a desired shape can be obtained.

EXAMPLES

Hereinafter, the present invention is described in detail with reference to the Examples and the Comparative Examples. However, the present invention is not limited by the Examples. First, each measuring method in the Examples and the Comparative Examples is described.

[Method for Measuring Average Primary Particle Diameter of Silica Particles]

The average primary particle diameter (specifically, Z average particle diameter calculated by a cumulant analysis) of the silica particles is measured, for example, by a particle diameter measuring device using dynamic light scattering method ("Zetasizer Nano ZS" manufactured by Malvern Instruments Ltd.).

As a measurement sample, a dispersion obtained by dispersing the silica particles to be measured in deionized water is used. When the assumed average primary particle diameter of the silica particles is less than 100 nm, the dispersion is prepared so that the concentration of the silica particles is 1 wt %. When the assumed average primary particle diameter of the silica particles is not less than 100 nm, the dispersion is prepared so that the concentration of the silica particles is 0.1 wt %. A polyethylene cell is set in a measurement unit of the particle diameter measuring device using dynamic light scattering method ("Zetasizer Nano ZS" manufactured by Malvern Instruments Ltd.) and the dispersion is dispensed on the polyethylene cell, so that the Z average particle diameter of the silica particles is measured.

The Z average particle diameter is a value obtained by analyzing, using the cumulant analysis, measurement data of the particle dispersion and the like by the dynamic light scattering method.

By the cumulant analysis, an average value of the particle diameter and a polydispersity index (PDI) can be obtained. The average value of the particle diameter is defined as the Z average particle diameter. More strictly, the cumulant analysis means fitting a polynomial to a logarithm of G1 correlation function obtained by the measurement. The constant b is called a secondary cumulant or a Z average diffusion coefficient in the following formula:

$$LN(G1)=A+bt+ct^2+dt^3+et^4+\ldots$$

The Z average particle diameter is obtained by converting the above constant b into the particle diameter using the viscosity of the dispersion and several device constants.

[Method for Measuring Adsorption Amount of Water-Soluble Cellulose Compound onto Silica Particles]

In Examples 1 to 3 described later, the dispersion medium containing the silica particles onto which the water-soluble cellulose compound adsorb is used, which is obtained by the method for producing the composite particles. The adsorption amount (g) of the water-soluble cellulose compound per 1 g of the silica particles is measured by the method described below.

The dispersion medium in an amount of 0.25 g, which contains the silica particles onto which the water-soluble cellulose compound adsorb, is diluted with 1 g of deionized water. Then, the diluted dispersion medium is centrifuged at 25000 G for 30 minutes using a centrifuge ("Hitach High Speed Refrigerated Centrifuge HIMAC CR22GII", manufactured by Hitachi High-Technologies Corporation). To 1 ml of the obtained supernatant liquid, 1 ml of 5% phenol aqueous solution is added, and further 5 ml of concentrated sulfuric acid is added. The mixture is left for 10 minutes, and further is left still in the aqueous solution of 25° C. for 10 minutes, thus the measurement sample is obtained. The absorbance of the measurement sample at 485 nm is measured using an ultraviolet and visible spectrophotometer ("Ultraviolet and Visible Spectrophotometer UV-2450" manufactured by SHIMADZU CORPORATION). Thus, the concentration of the water-soluble cellulose compound (g/l) in the supernatant liquid is obtained using a calibration curve (curve indicating the relation between the absorbance and the concentration of the water-soluble cellulose compound).

The calibration curve is made by the method described below. That is, 3 kinds of aqueous solutions, each having a different concentration of the water-soluble cellulose compound, are prepared, by adding to the 100 g of the deionized water respectively 0.01 g, 0.05 g and 0.1 g of the water-soluble cellulose compound that are used for preparing the dispersion medium. Each of the prepared aqueous solutions in the amount of 0.25 g is diluted with 0.75 g of the deionized water. The absorbance of each diluted aqueous solution is measured. Thus, the calibration curve, which is a primary curve, is made by plotting the weight of the water-soluble cellulose compound in the aqueous solution and the absorbance.

Then, the adsorption amount (g) of the water-soluble cellulose compound per 1 g of the silica particles is obtained by the following formula:

$$D=(W_H-C\times V)\div W_S$$

where D represents the adsorption amount (g) of the water-soluble cellulose compound per 1 g of the silica particles, C represents the concentration (g/l) of the water-soluble cellulose compound in the supernatant liquid, $W_H$ represents the weight (g) of the water-soluble cellulose compound used for preparing the composite particles, $W_S$ represents the weight (g) of the silica particles used for preparing the composite particles, and V represents the volume (l) of the aqueous medium used for preparing the dispersion medium in the production of the composite particles.

[Method for Measuring Volume Average Particle Diameter]

The volume average particle diameter of the particles (composite particles or polymer particles) obtained in the Examples and Comparative Examples described later is measured by Coulter Multisizer™ 3 (a measurement device manufactured by Beckman Coulter, Inc.). Note that the measurement is performed using the aperture calibrated according to the user's manual of Multisizer™ 3 issued by Beckman Coulter, Inc.

Regarding the selection of the aperture used for the measurement, when the assumed volume average particle diameter of the particles to be measured (composite particles or polymer particles) is not less than 1 μm and not more than 10 μm, the aperture having the size of 50 μm is selected. When the assumed volume average particle diameter of the particles to be measured (composite particles or polymer particles) is more than 10 μm and not more than 30 μm, the aperture having the size of 100 μm is selected. When the assumed volume average particle diameter of the particles to be measured (composite particles or polymer particles) is more than 30 μm and not more than 90 μm, the aperture having the size of 280 μm is selected. When the assumed volume average particle diameter of the particles to be measured (composite particles or polymer particles) is more than 90 μm and not more than 150 μm, the aperture having the size of 400 μm is selected. Thus, the size of the aperture is appropriately selected. When the measured volume average particle diameter is different from the assumed volume average particle diameter, a re-measurement is performed changing the aperture to the one having an appropriate size.

When the aperture having the size of 50 μm is selected, the "Current" (aperture current) is set to −800 and the "Gain" is set to 4. When the aperture having the size of 100

μm is selected, the "Current" (aperture current) is set to −1600 and the "Gain" is set to 2. When the apertures respectively having the size of 280 μm and 400 μm are selected, the "Current" (aperture current) is set to −3200 and the "Gain" is set to 1.

As the measurement sample, the dispersion is used, which is obtained by dispersing 0.1 g of particles to be measured (composite particles or polymer particles) in 10 ml of 0.1 wt % nonionic surfactant aqueous solution using a touch mixer ("TOUCHMIXER MT-31" manufactured by Yamato Scientific Co., Ltd.) and an ultrasonic cleaner ("ULTRASONIC CLEANER VS-150" manufactured by VELVO-CLEAR Co., Ltd.). A beaker filled with ISOTON® II (electrolyte for measurement, manufactured by Beckman Coulter, Inc.) is set in the measurement unit of the Coulter Multisizer™ 3. The dispersion is dripped while loosely stirring the inside of the beaker. After an indication of the concentration meter, which is on the display of the Coulter Multisizer™ 3 body, is set to 5 to 10%, the measurement is started. During measurement, the content of the beaker is being loosely stirred to the extent that no air bubble enters. The measurement is terminated when a hundred thousand particles have been measured. The volume average particle diameter of the particles (composite particles or polymer particles) is the arithmetic mean of the volume particle size distribution of the hundred thousand particles.

[Method for Measuring Ignition Residue]

The particles to be measured (composite particles or polymer particles) are weighed to prepare 1.0 g thereof. The weighed particles are burnt in an electric furnace at 550° C. for 30 minutes. Then, the weight (g) of the residue is measured. The measured weight of the residue (g) is divided by the weight of the particles before measurement (1.0 g), and the obtained value is converted into percentage. Thus, the ignition residue (wt %) is obtained.

[Method for Measuring Specific Surface Area]

The particles to be measured (composite particles or polymer particles) are weighed to prepare 0.25 g thereof. The weighed particles are mixed with 0.025 g of sodium dodecylbenzenesulfonate and 50 g of pure water. The mixture is stirred by ultrasonic for 10 minutes so as to disperse the resin particles, thus the measurement sample is obtained. The specific surface area of the particles in the measurement sample is measured using a laser diffraction particle size analyzer ("Mastersizer 2000" manufactured by Malvern Instruments Ltd.) under the measurement condition specified below.

<Measurement Condition>
Dispersion medium: water
Analytic model: general purpose
Particle refractive index: 1.50
Dispersion medium refractive index: 1.33

[Method for Calculating Additive Amount of Silica Particles]

The additive amount $(g/m^2)$ of the silica particles per unit surface area of the above-produced particles is obtained, using: the use weight of the silica particles and the use weight of the polymerizable vinyl monomer for producing the composite particles; and the specific surface area of the particles (composite particles or polymer particles) measured by the above-described measurement method of the specific surface area, by the following calculation formula:

Additive amount=$(W_s \div W_m) \div X$ where $W_s$ represents the use weight (g) of the silica particles for producing the composite particles, $W_m$ represents the use weight (g) of the polymerizable vinyl monomer for producing the composite particles, and X represents the specific surface area $(m^2/g)$ of the particles measured by the above-described measurement method of the specific surface area.

[Method for Calculating Adhesion Amount of Silica Particles]

In the particles obtained in the Examples and the Comparative Examples described later, the amount of the ignition residue is substantially equals the amount of the silica particles in the particles. Thus, the adhesion amount $(g/m^2)$ of the silica particles per unit surface area of the above-produced particles is obtained, using: the ignition residue measured by the above-described measurement method of the ignition residue; and the specific surface area of the particles measured by the above-described measurement method of the specific surface area, by the following calculation formula:

Adhesion amount=$(A \div 100) \div X$ where A represents the ignition residue (wt %) measured by the measurement method of the ignition residue, and X represents the specific surface area $(m^2/g)$ of the particles measured by the measurement method of the specific surface area.

In the above measurement method of the ignition residue, when the residue that remains after burning the particles in the electric furnace at 550° C. for 30 minutes contains components other than the silica particles, and thus when the amount of the ignition residue measured by the measurement method of the ignition residue differs from the amount of the silica particles in the particles, the adhesion amount $(g/m^2)$ of the silica particles per unit surface area of the above-produced particles can be obtained by the formula specified below. It is possible to use the known methods such as the elemental analysis to determine whether the residue contains the silica particles or not, or to determine the amount of the silica particles contained in the residue.

Adhesion amount=$\{(A \div 100) \times (B \div 100)\} \div X$ where A represents the ignition residue (wt %) measured by the measurement method of the ignition residue, B represents the content rate (wt %) of the silica particles in the residue, and X represents the specific surface area $(m^2/g)$ of the particles measured by the measurement method of the specific surface area.

Example 1: Preparation Example of Composite Particles

Into a polymerization vessel having a mixer, the following were fed: 150 g of water as the aqueous medium; 1.1 g of SNOWTEX® O-40 (abbreviated name: "ST-O-40", which is colloidal silica produced by NISSAN CHEMICAL INDUSTRIES LTD., with the average primary particle diameter of 25 nm and 40 wt % solid content) (net amount of $SiO_2$: 0.44 g) as the silica particles; and 0.09 g of Metolose® 65SH-400 (abbreviated name: "HPMC (65SH-400)", which is hydroxypropyl methylcellulose manufactured by Shin-Etsu Chemical Co., Ltd., with the cloud point of 65° C.) as the water-soluble cellulose compound, so that they were mixed at 60° C. for 24 hours. Thus, the dispersion medium was obtained, which contained the silica particles onto which the water-soluble cellulose compound adsorbed. The adsorption amount of the water-soluble cellulose compound onto the silica particles was measured using the dispersion medium, which resulted in 0.18 g of the water-soluble cellulose compound adsorbing onto 1 g of the silica particles.

Separately, the monomer mixture containing the polymerization initiator was prepared by mixing uniformly and dissolving: 50 g of methyl methacrylate (MMA) and 2.5 g of ethylene glycol dimethacrylate (EDGMA) as the polymerizable vinyl monomer; and 0.5 g of 2,2'-azobis(2,4-dimethylvaleronitrile) (ADVN) as the polymerization initiator.

The monomer mixture containing the polymerization initiator was added to the dispersion medium in the polymerization vessel, and the mixture was stirred at 4500 rpm for 3 minutes by a homomixer (High Flex Disperser HG-2, manufactured by SMT CO., LTD.), thus finely dispersing the monomer mixture in the dispersion medium.

Then, stirring was continued at the stirring speed of 70 rpm. After the temperature of the dispersion medium to which added the monomer mixture reached 55° C., the suspension polymerization was performed for 6 hours.

Then, the reaction liquid in the polymerization vessel was cooled to the room temperature while being stirred. Subsequently, the reaction liquid was subjected to suction filtration using qualitative filter paper 101 ("TOYO Qualitative Filter Paper" manufactured by ADVANTEC, MFS, INC.), and was washed by deionized water and subjected to deliquoring, before being dried in an oven at 90° C. for 24 hours. Thus, the composite particles were obtained.

Figure 2:
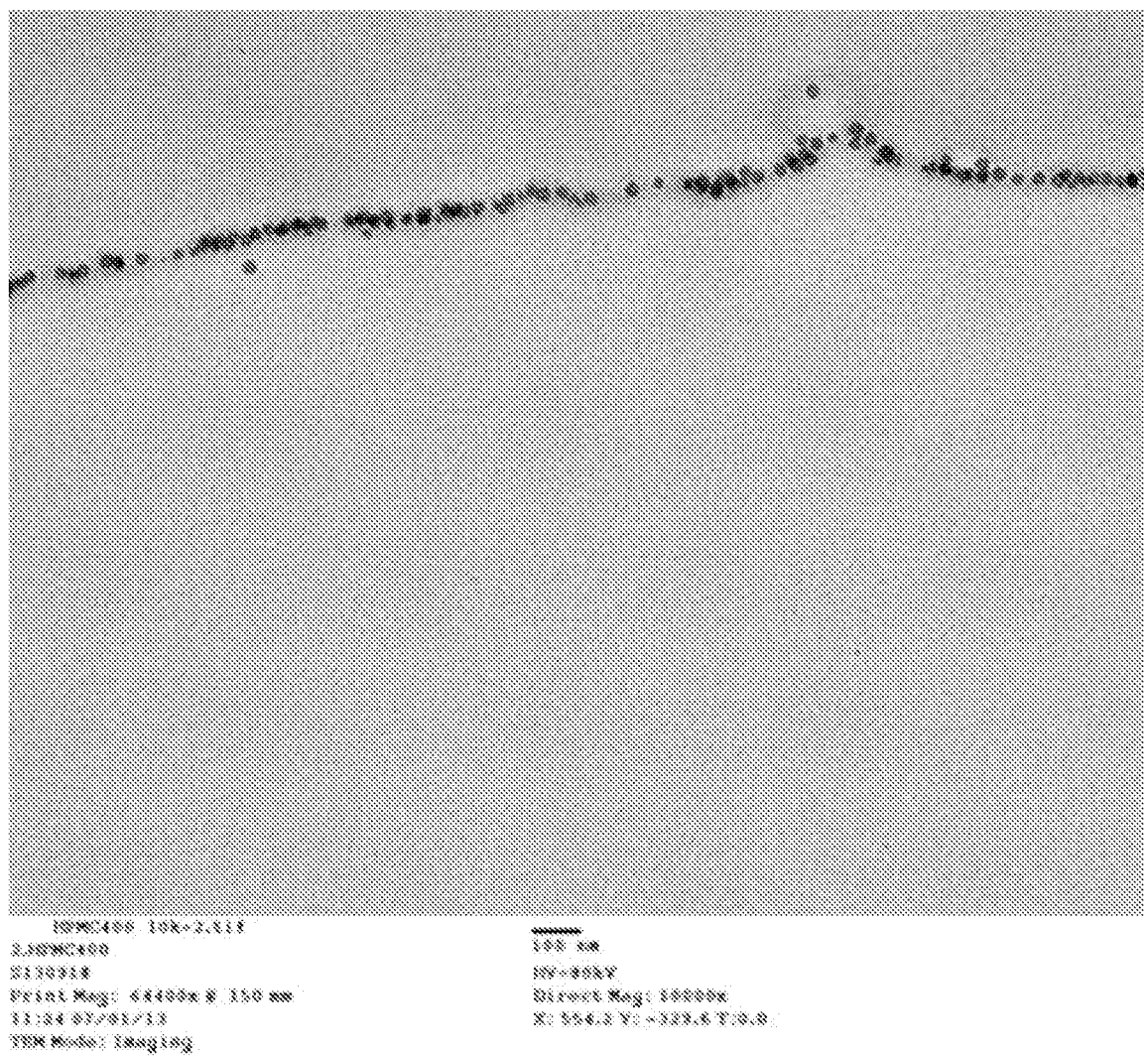
FIG. 2 is a transmission electron microscope (TEM) image showing a further enlarged part of the cross section of the composite particle obtained in Example 1 of the present invention which part is an interface part between polymer particles and silica particles of the composite particle.

The cross section of the obtained composite particles was confirmed by the TEM (transmission electron microscope). As shown in FIGS. 1 and 2, it was confirmed that the composite particles contained the polymer particles and the silica particles that adhered to the polymer particles. It was also confirmed that a layer of the silica particles was formed on the surface of the polymer particles in the composite particles.

Also, the obtained composite particles had the volume average particle diameter of 20.2 μm, the specific surface area of 0.29 m$^2$/g, and the ignition residue of 0.60 wt %. The additive amount of the silica particles was 0.029 g/m$^2$. The adhesion amount of the silica particles in the obtained composite particles was 0.021 g/m$^2$ per unit surface area of the composite particles.

Example 2: Preparation Example of Composite Particles

The composite particles were obtained in the same way as Example 1 except for using, as the water-soluble cellulose compound, 0.09 g of Metolose® 65SH-4000 (abbreviated name: "HPMC (65SH-4000)", which is hydroxypropyl methylcellulose manufactured by Shin-Etsu Chemical Co., Ltd., with the cloud point of 65° C.), in place of 0.09 g of Metolose® 65SH-400 (HPMC (655H-400)).

In the dispersion medium containing the silica particles onto which the water-soluble cellulose compound adsorbed, which was obtained in the preparation process of Example 2, the adsorption amount of the water-soluble cellulose compound was 0.17 g onto 1 g of the silica particles. Also, the obtained composite particles had the volume average particle diameter of 24.6 μm, the specific surface area of 0.24 m$^2$/g, and the ignition residue of 0.70 wt %. The additive amount of the silica particles was 0.035 g/m$^2$. The adhesion amount of the silica particles in the obtained composite particles was 0.029 g/m$^2$.

Example 3: Preparation Example of Composite Particles

The composite particles were obtained in the same way as Example 1 except for: using, as the water-soluble cellulose compound, 0.09 g of Metolose® 65SH-50 (abbreviated name: "HPMC (65SH-50)", which is hydroxypropyl methylcellulose manufactured by Shin-Etsu Chemical Co., Ltd., with the cloud point of 65° C.), in place of 0.09 g of Metolose® 65SH-400 (HPMC (65SH-400)); and further using 0.05 g of KAYAMER® PM-21 (abbreviated name: "PM-21", manufactured by Nippon Kayaku Co., Ltd.) as the polymerizable phosphoric acid monomer in the preparation of the monomer mixture.

In the dispersion medium containing the silica particles onto which the water-soluble cellulose compound adsorbed, which was obtained in the preparation process of Example 3, the adsorption amount of the water-soluble cellulose compound was 0.16 g onto 1 g of the silica particles. Also, the obtained composite particles had the volume average particle diameter of 21.8 μm, the specific surface area of 0.28 m$^2$/g, and the ignition residue of 0.60 wt %. The additive amount of the silica particles was 0.030 g/m$^2$. The adhesion amount of the silica particles in the obtained composite particles was 0.021 g/m$^2$.

Example 4: Preparation Example of Composite Particles

The composite particles were obtained in the same way as Example 1 except for using, as the polymerizable vinyl monomer, 50 g of styrene (St) and 2.5 g of ethylene glycol dimethacrylate (EGDMA), in place of 50 g of methyl methacrylate (MMA) and 2.5 g of ethylene glycol dimethacrylate (EDGMA).

The obtained composite particles had the volume average particle diameter of 20 μm, the specific surface area of 0.29 m$^2$/g, and the ignition residue of 0.80 wt %. The additive amount of the silica particles was 0.029 g/m$^2$. The adhesion amount of the silica particles in the obtained composite particles was 0.028 g/m$^2$.

Example 5: Preparation Example of Composite Particles

The composite particles were obtained in the same way as Example 1 except for using, as the silica particles, 2.3 g of SNOWTEX® OXS (abbreviated name: "ST-OXS", which is colloidal silica manufactured by NISSAN CHEMICAL INDUSTRIES LTD., with the average primary particle diameter of 7.8 nm and 15 wt % solid content) (net amount of SiO$_2$: 0.35 g), in place of 1.1 g of SNOWTEX® O-40 ("ST-O-40"; net amount of SiO$_2$: 0.44 g).

The obtained composite particles had the volume average particle diameter of 20.5 μm, the specific surface area of 0.29 m$^2$/g, and the ignition residue of 0.33 wt %. The additive amount of the silica particles was 0.023 g/m$^2$. The adhesion amount of the silica particles in the obtained composite particles was 0.011 g/m$^2$.

Example 6: Preparation Example of Composite Particles

The composite particles were obtained in the same way as Example 1 except for using, as the silica particles, 4.28 g of SNOWTEX® OZL-35 (abbreviated name: "ST-OZL-35", which is colloidal silica manufactured by NISSAN CHEMICAL INDUSTRIES LTD., with the average primary particle diameter of 85 nm and 35 wt % solid content) (net amount of SiO$_2$: 1.5 g), in place of 1.1 g of SNOWTEX® O-40 ("ST-O-40"; net amount of SiO$_2$: 0.44 g).

The obtained composite particles had the volume average particle diameter of 20.9 µm, the specific surface area of 0.29 m$^2$/g, and the ignition residue of 1.9 wt %. The additive amount of the silica particles was 0.10 g/m$^2$. The adhesion amount of the silica particles in the obtained composite particles was 0.066 g/m$^2$.

Example 7: Preparation Example of Composite Particles

The composite particles were obtained in the same way as Example 1 except for using, as the silica particles, 2.53 g of SNOWTEX® PS-MO (abbreviated name: "ST-PS-MO", which is colloidal silica manufactured by NISSAN CHEMICAL INDUSTRIES LTD., spherical particles with the average primary particle diameter of 21.5 nm being coupled, with 15 wt % solid content) (net amount of SiO$_2$: 0.38 g), in place of 1.1 g of SNOWTEX® O-40 ("ST-O-40"; net amount of SiO$_2$: 0.44 g).

The obtained composite particles had the volume average particle diameter of 20.5 µm, the specific surface area of 0.29 m$^2$/g, and the ignition residue of 0.60 wt %. The additive amount of the silica particles was 0.025 g/m$^2$. The adhesion amount of the silica particles in the obtained composite particles was 0.021 g/m$^2$.

Example 8: Preparation Example of Composite Particles

The composite particles were obtained in the same way as Example 3 except for: using, as the water-soluble cellulose compound, 0.09 g of NISSO HPC H (hydroxypropyl cellulose having the lower critical solution temperature of 45° C., manufactured by NIPPON SODA CO., LTD.) in place of 0.09 g of Metolose® 65SH-50 (HPMC (65SH-50)); and further changing the mixing temperature when preparing the dispersion medium from 60° C. to 40° C.

The obtained composite particles had the volume average particle diameter of 19.8 µm, the specific surface area of 0.29 m$^2$/g, and the ignition residue of 0.80 wt %. The additive amount of the silica particles was 0.029 g/m$^2$. The adhesion amount of the silica particles in the obtained composite particles was 0.028 g/m$^2$.

Example 9: Preparation Example of Composite Particles

The composite particles were obtained in the same way as Example 1 except for: changing the amount to be used of SNOWTEX® O-40 ("ST-O-40") as the silica particles to 2.75 g (net amount of SiO$_2$: 1.1 g); changing the amount to be used of Metolose® 65SH-400 (HPMC (65SH-400)) as the water-soluble cellulose compound to 0.22 g; and further changing the rotational speed of the homomixer from 4500 rpm to 9000 rpm.

The obtained composite particles had the volume average particle diameter of 7.9 µm, the specific surface area of 0.63 m$^2$/g, and the ignition residue of 1.45 wt %. The additive amount of the silica particles was 0.033 g/m$^2$. The adhesion amount of the silica particles in the obtained composite particles was 0.023 g/m$^2$.

Example 10: Preparation Example of Composite Particles

The composite particles were obtained in the same way as Example 1 except for: changing the amount to be used of SNOWTEX® O-40 ("ST-O-40") as the silica particles to 0.55 g (net amount of SiO$_2$: 0.22 g); changing the amount to be used of Metolose® 65SH-400 (HPMC (65SH-400)) as the water-soluble cellulose compound to 0.04 g; and further changing the rotational speed of the homomixer from 4500 rpm to 2500 rpm.

The obtained composite particles had the volume average particle diameter of 40.9 µm, the specific surface area of 0.13 m$^2$/g, and the ignition residue of 0.29 wt %. The additive amount of the silica particles was 0.033 g/m$^2$. The adhesion amount of the silica particles in the obtained composite particles was 0.022 g/m$^2$.

Example 11: Preparation Example of Composite Particles

The composite particles were obtained in the same way as Example 1 except for: changing the amount to be used of SNOWTEX® O-40 ("ST-O-40") as the silica particles to 0.28 g (net amount of SiO$_2$: 0.11 g); changing the amount to be used of Metolose® 65SH-400 (HPMC (65SH-400)) as the water-soluble cellulose compound to 0.02 g; and further changing the rotational speed of the homomixer from 4500 rpm to 2500 rpm.

The obtained composite particles had the volume average particle diameter of 80.7 µm, the specific surface area of 0.06 m$^2$/g, and the ignition residue of 0.15 wt %. The additive amount of the silica particles was 0.033 g/m$^2$. The adhesion amount of the silica particles in the obtained composite particles was 0.025 g/m$^2$.

Example 12: Preparation Example of Composite Particles

The composite particles were obtained in the same way as Example 1 except for: changing the amount to be used of the water as the aqueous medium to 200 g; changing the amount to be used of SNOWTEX® O-40 ("ST-O-40") as the silica particles to 4.0 g (net amount of SiO$_2$: 1.6 g); changing the amount to be used of Metolose® 65SH-400 (HPMC (65SH-400)) as the water-soluble cellulose compound to 0.32 g; using, as the polymerizable vinyl monomer, 140 g of methyl methacrylate (MMA) and 60 g of trimethylolpropane triacrylate (TMPTA) in place of 50 g of methyl methacrylate (MMA) and 2.5 g of ethylene glycol dimethacrylate (EDGMA); and using, as the polymerization initiator, 1.0 g of lauroyl peroxide (LPO) in place of 0.5 g of 2,2'-azobis (2,4-dimethylvaleronitrile) (ADVN).

The obtained composite particles had the volume average particle diameter of 20.1 µm, the specific surface area of 0.29 m$^2$/g, and the ignition residue of 0.70 wt %. The additive amount of the silica particles was 0.029 g/m$^2$. The adhesion amount of the silica particles in the obtained composite particles was 0.024 g/m$^2$.

Comparative Example 1: Comparative Preparation Example of Composite Particles The suspension polymerization was attempted to be performed in the same way as Example 1 except for not using Metolose® 65SH-400 (HPMC (65SH-400)) as the water-soluble cellulose compound. However, the composite particles were not obtained because of low stability of the droplets of the monomer mixture in the dispersion medium.

Comparative Example 2: Comparative Preparation Example of Composite Particles The suspension polymerization was attempted to be performed in the same way as Example 1 except for not using SNOWTEX® O-40 ("ST-O-40") as the silica particles. However, the composite particles were not obtained because of low stability of the droplets of the monomer mixture in the dispersion medium.

Comparative Example 3: Comparative Preparation Example of Composite Particles

The suspension polymerization was attempted to be performed in the same way as Example 1 except for using 0.09 g of Gohsenol™ GL-05 (abbreviated name: "GL-05", polyvinyl alcohol (PVA) manufactured by The Nippon Synthetic Chemical Industry Co., Ltd.) in place of 0.09 g of Metolose® 65SH-400 (HPMC (655H-400)) as the water-soluble cellulose compound in the preparation of the dispersion medium. However, the composite particles were not obtained because of low stability of the droplets of the monomer mixture in the dispersion medium.

Comparative Example 4: Comparative Preparation Example of Composite Particles

Into a polymerization vessel having a mixer, the following were fed: 200 g of water as the aqueous medium; 2.67 g of SNOWTEX® OXS (abbreviated name: "ST-OXS", which is colloidal silica manufactured by NISSAN CHEMICAL INDUSTRIES LTD., with the average primary particle diameter of 7.8 nm and 1.5 wt % solid content) (net amount of $SiO_2$: 0.40 g) as the silica particles; and 0.02 g of polyoxyethylene lauryl ether as the surfactant, so that they were mixed at 30° C. for 1 hours. Thus, the dispersion medium was obtained, which contained the silica particles and the surfactant.

Separately, the monomer mixture containing the polymerization initiator was prepared by mixing uniformly and dissolving: 140 g of methyl methacrylate (MMA) and 60 g of trimethylolpropane triacrylate (TMPTA) as the polymerizable vinyl monomer; and 1.0 g of lauroyl peroxide (LPO) as the polymerization initiator.

The monomer mixture containing the polymerization initiator was added to the dispersion medium in the polymerization vessel, and the mixture was stirred at 4500 rpm for 3 minutes by the homomixer to finely disperse the monomer mixture in the dispersion medium, and then 1.0 g of PVA-420 (polyvinyl alcohol (PVA) manufactured by KURARAY CO., LTD.) was added as a dispersion stabilizer.

Then, stirring was continued at the stirring speed of 100 rpm. After the temperature of the dispersion medium to which added the monomer mixture reached 55° C., the suspension polymerization was performed for 6 hours.

Then, the reaction liquid in the polymerization vessel was cooled to the room temperature while being stirred. Subsequently, the reaction liquid was subjected to suction filtration using qualitative filter paper 101 ("TOYO Qualitative Filter Paper" manufactured by ADVANTEC, MFS, INC.), and was washed by deionized water and subjected to deliquoring, before being dried in an oven at 90° C. for 24 hours. Thus, the composite particles were obtained.

The obtained composite particles had the volume average particle diameter of 20.6 μm, the specific surface area of 0.29 $m^2$/g, and the ignition residue of 0.10 wt %. The additive amount of the silica particles was 0.0069 g/$m^2$. The adhesion amount of the silica particles in the obtained composite particles was 0.0034 g/$m^2$.

Comparative Example 5: Comparative Preparation Example of Composite Particles

The composite particles were attempted to be prepared in the same way as Comparative Example 4 except for: using, as the silica particles, 1.0 g of SNOWTEX® OL (abbreviated name: "ST-OL", which is colloidal silica manufactured by NISSAN CHEMICAL INDUSTRIES LTD., with the average primary particle diameter of 70 nm and 20 wt % solid content) (net amount of $SiO_2$: 0.20 g), in place of 2.67 g of SNOWTEX® OXS ("ST-OXS"; net amount of $SiO_2$: 0.40 g); and changing the amount to be used of the polyoxyethylene lauryl ether to 0.03 g. The particles obtained in Comparative Example 5 had the volume average particle diameter of 20.4 μm and the specific surface area of 0.29 $m^2$/g. The additive amount of the silica particles was 0.0034 g/$m^2$, however, the ignition residue was less than the quantitative lower limit. As the ignition residue was less than the quantitative lower limit, it was confirmed that the particles obtained in Comparative Example 5 contained few silica particles. Thus, the particles were confirmed to be the polymer particles, not the composite particles.

Comparative Example 6: Comparative Preparation Example of Composite Particles

The composite particles were attempted to be prepared in the same way as Comparative Example 4 except for using, as the silica particles, 0.5 g of SNOWTEX® MP-2040 (abbreviated name: "ST-MP-2040", which is colloidal silica manufactured by NISSAN CHEMICAL INDUSTRIES LTD., with the average primary particle diameter of 200 nm and 40 wt % solid content) (net amount of $SiO_2$: 0.20 g), in place of 2.67 g of SNOWTEX® OXS ("ST-OXS"; net amount of $SiO_2$: 0.40 g). The particles obtained in Comparative Example 6 had the volume average particle diameter of 20.1 μm and the specific surface area of 0.29 $m^2$/g. The additive amount of the silica particles was 0.0034 g/$m^2$, however, the ignition residue was less than the quantitative lower limit. As the ignition residue was less than the quantitative lower limit, it was confirmed that the particles obtained in Comparative Example 6 contained few silica particles. Thus, the particles were confirmed to be the polymer particles, not the composite particles.

Comparative Example 7: Comparative Preparation Example of Composite Particles

The composite particles were attempted to be prepared in the same way as Comparative Example 4 except for: using, as the silica particles, 1.5 g of SNOWTEX® MP-4540M (abbreviated name: "ST-MP-4540M", which is colloidal silica manufactured by NISSAN CHEMICAL INDUSTRIES LTD., with the average primary particle diameter of 450 nm and 40 wt % solid content) (net amount of $SiO_2$: 0.60 g), in place of 2.67 g of SNOWTEX® OXS ("ST-OXS"; net amount of $SiO_2$: 0.40 g); and changing the amount to be used of the polyoxyethylene lauryl ether to 0.06 g.

The particles obtained in Comparative Example 7 had the volume average particle diameter of 20.3 μm and the specific surface area of 0.29 $m^2$/g. The additive amount of the silica particles was 0.010 g/$m^2$, however, the ignition residue was less than the quantitative lower limit. As the ignition residue was less than the quantitative lower limit, it was confirmed that the particles obtained in Comparative Example 7 contained few silica particles. Thus, the particles were confirmed to be the polymer particles, not the composite particles.

Comparative Example 8: Comparative Preparation Example of Composite Particles

The composite particles were attempted to be prepared in the same way as Example 1 except for obtaining the dispersion medium containing the water-soluble cellulose compound and the silica particles without mixing the mixture at 60° C. for 24 hours (i.e., without the treatment to adsorb the water-soluble cellulose compound onto the silica particles) after feeding the water, the silica particles and the water-soluble cellulose compound into the polymerization vessel having a mixer. However, the particles stuck to each other during the polymerization, thus the composite particles were not obtained.

Comparative Example 9: Comparative Preparation Example of Composite Particles

The composite particles were attempted to be prepared in the same way as Comparative Example 4 except for: changing the amount to be used of SNOWTEX® OXS ("ST-OXS") as the silica particles to 10.6 g (net amount of $SiO_2$: 1.6 g); changing the amount to be used of the polyoxyethylene lauryl ether as the surfactant to 0.04 g; and further changing the rotational speed of the homomixer from 4500 rpm to 9000 rpm.

The composite particles obtained in Comparative Example 9 had the volume average particle diameter of 4.7 μm, the specific surface area of 1.06 $m^2/g$, and the ignition residue of 0.40 wt %. The additive amount of the silica particles was 0.0075 $g/m^2$. The adhesion amount of the silica particles in the obtained composite particles was 0.0038 $g/m^2$.

Comparative Example 10: Comparative Preparation Example of Composite Particles

The composite particles were attempted to be prepared in the same way as Comparative Example 4 except for: changing the amount to be used of SNOWTEX® OXS ("ST-OXS") as the silica particles to 0.67 g (net amount of $SiO_2$: 0.10 g); and changing the rotational speed of the homomixer from 4500 rpm to 1500 rpm.

The particles obtained in Comparative Example 10 had the volume average particle diameter of 130 μm and the specific surface area of 0.04 $m^2/g$. The additive amount of the silica particles was 0.010 $g/m^2$, however, the ignition residue was less than the quantitative lower limit. As the ignition residue was less than the quantitative lower limit, it was confirmed that the particles obtained in Comparative Example 10 contained few silica particles. Thus, the particles were confirmed to be the polymer particles, not the composite particles.

Regarding Examples 1 to 12 and Comparative Examples 1 to 10, Tables 1 to 4 below indicate respectively the following: the respective amounts of the materials used for the production; the measurement results of the respective average primary particle diameters of the silica particles used for the production; the measurement results of the respective volume average particle diameters, specific surface areas, and ignition residues of the particles (composite particles) obtained by the production; the calculation results of the respective additive amounts of the silica particles; and the calculation results of the respective adhesion amounts of the silica particles in the composite particles obtained by the production.

TABLE 1

|  |  |  | Examples | | | | | |
|---|---|---|---|---|---|---|---|---|
|  |  |  | 1 | 2 | 3 | 4 | 5 | 6 |
| Used Materials (g) | Polymerizable Vinyl Monomers | MMA | 50 | 50 | 50 | — | 50 | 50 |
|  |  | EGDMA | 2.5 | 2.5 | 2.5 | 2.5 | 2.5 | 2.5 |
|  |  | TMPTA | — | — | — | — | — | — |
|  |  | St | — | — | — | 50 | — | — |
|  | Polymerizable Phosphoric Acid Monomers | PM-21 | — | — | 0.05 | — | — | — |
|  | Polymerization Initiator | ADVN | 0.5 | 0.5 | 0.5 | 0.5 | 0.5 | 0.5 |
|  |  | LPO | — | — | — | — | — | — |
|  | Silica Particles | ST-O-40 | 1.1 (0.44) | 1.1 (0.44) | 1.1 (0.44) | 1.1 (0.44) | — | — |
|  |  | ST-OXS | — | — | — | — | 2.3 (0.35) | — |
|  |  | ST-OZL-35 | — | — | — | — | — | 4.28 (1.5) |
|  |  | ST-PS-MO | — | — | — | — | — | — |
|  |  | ST-OL | — | — | — | — | — | — |
|  |  | MP-2040 | — | — | — | — | — | — |
|  |  | MP-4540M | — | — | — | — | — | — |
|  | Water-Soluble Cellulose Compound | NISSO HPC H | — | — | — | — | — | — |
|  |  | HPMC(65SH-50) | — | — | 0.09 | — | — | — |
|  |  | HPMC(65SH-400) | 0.09 | — | — | 0.09 | 0.09 | 0.09 |
|  |  | HPMC(65SH-4000) | — | 0.09 | — | — | — | — |
|  | Sulfactant | Polyoxyethylene Lauryl Ether | — | — | — | — | — | — |
|  | PVA | PVA-420 | — | — | — | — | — | — |
|  |  | GL-05 | — | — | — | — | — | — |
| Measurement/ Calculation Results | Silica Particles | Average Primary Particle Diameter (nm) | 25 | 25 | 25 | 25 | 7.8 | 85 |
|  | Composite Particles | Volume Average Particle Diameter (μm) | 20.2 | 24.6 | 21.8 | 20 | 20.5 | 20.9 |
|  |  | Specific Surface Area ($m^2/g$) | 0.29 | 0.24 | 0.28 | 0.29 | 0.29 | 0.29 |

TABLE 1-continued

|  |  | Examples | | | | | |
|---|---|---|---|---|---|---|---|
|  |  | 1 | 2 | 3 | 4 | 5 | 6 |
|  | Ignition Residue (wt. %) | 0.60 | 0.70 | 0.60 | 0.80 | 0.33 | 1.9 |
|  | Additive Amount (g/m$^2$) | 0.029 | 0.035 | 0.030 | 0.029 | 0.023 | 0.10 |
|  | Adhesion Amount (g/m$^2$) | 0.021 | 0.029 | 0.021 | 0.028 | 0.011 | 0.066 |

Note 1:
The value in parentheses means net amount of SiO$_2$

TABLE 2

|  |  |  | Examples | | | | | |
|---|---|---|---|---|---|---|---|---|
|  |  |  | 7 | 8 | 9 | 10 | 11 | 12 |
| Used Materials (g) | Polymerizable Vinyl Monomers | MMA | 50 | 50 | 50 | 50 | 50 | 140 |
|  |  | EGDMA | 2.5 | 2.5 | 2.5 | 2.5 | 2.5 | — |
|  |  | TMPTA | — | — | — | — | — | 60 |
|  |  | St | — | — | — | — | — | — |
|  | Polymerizable Phosphoric Acid Monomers | PM-21 | — | 0.05 | — | — | — | — |
|  | Polymerization Initiator | ADVN | 0.5 | 0.5 | 0.5 | 0.5 | 0.5 | — |
|  |  | LPO | — | — | — | — | — | 1.0 |
|  | Silica Particles | ST-O-40 | — | 1.1 (0.44) | 2.75 (1.1) | 0.55 (0.22) | 0.28 (0.11) | 4.0 (1.6) |
|  |  | ST-OXS | — | — | — | — | — | — |
|  |  | ST-OZL-35 | — | — | — | — | — | — |
|  |  | ST-PS-MO | 2.53 (0.38) | — | — | — | — | — |
|  |  | ST-OL | — | — | — | — | — | — |
|  |  | MP-2040 | — | — | — | — | — | — |
|  |  | MP-4540M | — | — | — | — | — | — |
|  | Water-Soluble Cellulose Compound | NISSO HPC H | — | 0.09 | — | — | — | — |
|  |  | HPMC(65SH-50) | — | — | — | — | — | — |
|  |  | HPMC(65SH-400) | 0.09 | — | 0.22 | 0.04 | 0.02 | 0.32 |
|  |  | HPMC(65SH-4000) | — | — | — | — | — | — |
|  | Sulfactant | Polyoxyethylene Lauryl Ether | — | — | — | — | — | — |
|  | PVA | PVA-420 | — | — | — | — | — | — |
|  |  | GL-05 | — | — | — | — | — | — |
| Measurement/ Calculation Results | Silica Particles | Average Primary Particle Diameter (nm) | 21.5 | 25 | 25 | 25 | 25 | 25 |
|  | Composite Particles | Volume Average Particle Diameter (μm) | 20.5 | 19.8 | 7.9 | 40.9 | 80.7 | 20.1 |
|  |  | Specific Surface Area (m$^2$/g) | 0.29 | 0.29 | 0.63 | 0.13 | 0.06 | 0.29 |
|  |  | Ignition Residue (wt. %) | 0.60 | 0.80 | 1.45 | 0.29 | 0.15 | 0.70 |
|  |  | Additive Amount (g/m$^2$) | 0.025 | 0.029 | 0.033 | 0.033 | 0.033 | 0.029 |
|  |  | Adhesion Amount (g/m$^2$) | 0.021 | 0.028 | 0.023 | 0.022 | 0.025 | 0.024 |

Note 1:
The value in parentheses means net amount of SiO$_2$

TABLE 3

|  |  |  | Comparative Examples | | | | | |
|---|---|---|---|---|---|---|---|---|
|  |  |  | 1 | 2 | 3 | 4 | 5 |  |
| Used Materials (g) | Polymerizable Vinyl Monomers | MMA | 50 | 50 | 50 | 140 | 140 |  |
|  |  | EGDMA | 2.5 | 2.5 | 2.5 | — | — |  |
|  |  | TMPTA | — | — | — | 60 | 60 |  |
|  |  | St | — | — | — | — | — |  |

TABLE 3-continued

|  |  |  | Comparative Examples | | | | |
|---|---|---|---|---|---|---|---|
|  |  |  | 1 | 2 | 3 | 4 | 5 |
|  | Polymerizable Phosphoric Acid Monomers | PM-21 | — | — | — | — | — |
|  | Polymerization Initiator | ADVN | 0.5 | 0.5 | 0.5 | — | — |
|  |  | LPO | — | — | — | 1.0 | 1.0 |
|  | Silica Particles | ST-O-40 | 1.1 (0.44) | — | 1.1 (0.44) | — | — |
|  |  | ST-OXS | — | — | — | 2.67 (0.40) | — |
|  |  | ST-OZL-35 | — | — | — | — | — |
|  |  | ST-PS-MO | — | — | — | — | — |
|  |  | ST-OL | — | — | — | — | 1.0 (0.20) |
|  |  | MP-2040 | — | — | — | — | — |
|  |  | MP-4540M | — | — | — | — | — |
|  | Water-Soluble Cellulose Compound | NISSO HPC H | — | — | — | — | — |
|  |  | HPMC(65SH-50) | — | — | — | — | — |
|  |  | HPMC(65SH-400) | — | 0.09 | — | — | — |
|  |  | HPMC(65SH-4000) | — | — | — | — | — |
|  | Sulfactant | Polyoxyethylene Lauryl Ether | — | — | — | 0.02 | 0.03 |
|  | PVA | PVA-420 | — | — | — | 1.0 | 1.0 |
|  |  | GL-05 | — | — | 0.09 | — | — |
| Measurement/ Calculation Results | Silica Particles | Average Primary Particle Diameter (nm) | 25 | — | 25 | 7.8 | 70 |
|  | Composite Particles or Polymer Particles | Volume Average Particle Diameter (μm) | — | — | — | 20.6 | 20.4 |
|  |  | Specific Surface Area (m²/g) | — | — | — | 0.29 | 0.29 |
|  |  | Ignition Residue (wt. %) | — | — | — | 0.10 | * |
|  |  | Additive Amount (g/m²) | — | — | — | 0.0069 | 0.0034 |
|  |  | Adhesion Amount (g/m²) | — | — | — | 0.0034 | * |

Note 1:
The value in parentheses means net amount of $SiO_2$
Note 2:
"*" means "less than quantitative lower limit".

TABLE 4

|  |  |  | Comparative Examples | | | | |
|---|---|---|---|---|---|---|---|
|  |  |  | 6 | 7 | 8 | 9 | 10 |
| Used Materials (g) | Polymerizable Vinyl Monomers | MMA | 140 | 140 | 50 | 140 | 140 |
|  |  | EGDMA | — | — | 2.5 | — | — |
|  |  | TMPTA | 60 | 60 | — | 60 | 60 |
|  |  | St | — | — | — | — | — |
|  | Polymerizable Phosphoric Acid Monomers | PM-21 | — | — | — | — | — |
|  | Polymerization Initiator | ADVN | — | — | 0.5 | — | — |
|  |  | LPO | 1.0 | 1.0 | — | 1.0 | 1.0 |
|  | Silica Particles | ST-O-40 | — | — | 1.1 (0.44) | — | — |
|  |  | ST-OXS | — | — | — | 10.6 (1.6) | 0.67 (0.10) |
|  |  | ST-OZL-35 | — | — | — | — | — |
|  |  | ST-PS-MO | — | — | — | — | — |
|  |  | ST-OL | — | — | — | — | — |
|  |  | MP-2040 | 0.5 (0.20) | — | — | — | — |
|  |  | MP-4540M | — | 1.5 (0.60) | — | — | — |
|  | Water-Soluble Cellulose Compound | NISSO HPC H | — | — | — | — | — |
|  |  | HPMC(65SH-50) | — | — | — | — | — |
|  |  | HPMC(65SH-400) | — | — | 0.09 | — | — |
|  |  | HPMC(65SH-4000) | — | — | — | — | — |

TABLE 4-continued

|  |  |  | Comparative Examples | | | | |
|---|---|---|---|---|---|---|---|
|  |  |  | 6 | 7 | 8 | 9 | 10 |
|  | Sulfactant | Polyoxyethylene Lauryl Ether | 0.02 | 0.06 | — | 0.04 | 0.02 |
|  | PVA | PVA-420 GL-05 | 1.0 | 1.0 | — | 1.0 | 1.0 |
| Measurement/ Calculation Results | Silica Particles | Average Primary Particle Diameter (nm) | 200 | 450 | 25 | 7.8 | 7.8 |
|  | Composite Particles or Polymer Particles | Volume Average Particle Diameter (μm) | 20.1 | 20.3 | — | 4.7 | 130 |
|  |  | Specific Surface Area ($m^2/g$) | 0.29 | 0.29 | — | 1.06 | 0.04 |
|  |  | Ignition Residue (wt. %) | * | * | — | 0.40 | * |
|  |  | Additive Amount ($g/m^2$) | 0.0034 | 0.010 | — | 0.0075 | 0.010 |
|  |  | Adhesion Amount ($g/m^2$) | * | * | — | 0.0038 | * |

Note 1: The value in parentheses means net amount of $SiO_2$
Note 2: "*" means "less than quantitative lower limit".

As can be seen the results shown in Tables 1 to 4, it was confirmed that the particles obtained in Examples 1 to 12 were the composite particles containing the polymer particles and the silica particles that adhered to the surfaces of the polymer particles. Also, in Examples 1 to 12, when the composite particles obtained by the suspension polymerization were subjected to washing and deliquoring, the silica particles hardly fell off. Thus, it was confirmed that the composite particles obtained in Examples 1 to 12 had the characteristics that the silica particles strongly adhere to the surfaces of the polymer particles, i.e., the silica particles hardly fall off the surfaces of the polymer particles. Also, it was confirmed that, in the composite particles obtained in Examples 1 to 12, the adhesion amount of the silica particles to the surfaces of the polymer particles was 0.010 to 0.10 $g/m^2$ (more specifically, 0.011 to 0.066 $g/m^2$), which was large. Thus, it was confirmed that, in the composite particles of the present invention, many silica particles adhere to the surfaces of the polymer particles.

In contrast, the particles were not obtained in Comparative Examples 1 to 3 and 8. Also, in Comparative Examples 5 to 7 and 10, which were according to the methods for producing the resin particle disclosed in Patent Literature 1, the polymer particles were obtained, however, the adhesion amount the silica particles to the surfaces of the polymer particles was small relative to the additive amount (corresponding to the "covered amount" of Patent Literature 1) of the silica particles. Specifically, in Comparative Examples 5 to 7 and 10, the additive amount of the silica particles was 0.0034 to 0.010 $g/m^2$, while the ignition residue was less than the quantitative lower limit. Thus, it was not confirmed that the silica particles adhered to the surfaces of the obtained polymer particles. Also, in Comparative Examples 4 and 9, the composite particles containing the polymer particles and the silica particles that adhered to the surfaces of the polymer particles were obtained. However, it was confirmed that when the composite particles obtained by the suspension polymerization were subjected to washing and deliquoring, the silica particles fell off. Thus, it was confirmed that the composite particles obtained in Comparative Examples 4 and 9 had the characteristics that the silica particles do not strongly adhere to the surfaces of the polymer particles, i.e., the silica particles easily fall off the surfaces of the polymer particles. Furthermore, in Comparative Examples 4 and 9, the additive amount of the silica particles was 0.0069 to 0.0075 $g/m^2$, while the adhesion amount of the silica particles to the surfaces of the polymer particles of the obtained composite particles was 0.0034 to 0.0038 $g/m^2$, which was smaller than the above additive amount of the silica particles, and also smaller than the adhesion amount of the silica particles to the surfaces of the polymer particles of the composite particles in Examples 1 to 12.

Example 13: Preparation Example of Optical Film

A coating agent was obtained by mixing: 30 g of the particles (composite particles) obtained in Example 8; 100 g of acrylic polyol (trade name: "Mesium VM" manufactured by Dainichiseika Color & Chemicals Mfg. Co., Ltd., with 34 wt % resin solid resin content, solvent dispersion type) as the binder resin; and 30 g of isocyanate (trade name: VM-D, manufactured by Dainichiseika Color & Chemicals Mfg. Co., Ltd.) as the curing agent. After that, the obtained coating agent was applied, using an applicator, onto a polyester film having the thickness of 100 μm as a base material. The coated film was subjected to hot-air drying at 70° C. for 10 minutes, thus, the optical film was obtained. Then, the total light transmittance, the haze and the gloss of the obtained optical film were measured. The results are shown in Table 5 below.

TABLE 5

|  | Total Light Transmittance | Haze | Gloss |
|---|---|---|---|
| Example 13 | 95.7 | 88.7 | 12 |

[Method for Measuring Total Light Transmittance and Haze]

The haze and the total light transmittance of the optical film obtained in Example 13 were measured by a haze meter "NDH-4000" manufactured by NIPPON DENSHOKU INDUSTRIES CO., LTD. The measurement of the total light transmittance was performed under JIS K 7361-1 test conditions, while the measurement of the haze was performed under JIS K 7136 test conditions. Note that the haze and the total light transmittance shown in Table 5 are each an average value of the measured values of two measurement samples (number of measurement samples n=2). The haze value increases as the diffusibility of the light that transmits the optical film (transmitted light) increases.

[Method for Measuring Gloss]

The gloss of the optical film obtained in Example 13 was measured by a gloss checker (gloss meter) "IG-331" manufactured by HORIBA, Ltd. Specifically, the gloss of the optical film at 60° was measured by the gloss checker (gloss meter) "IG-331" in accordance with the method described in JIS Z 8741. The gloss value decreases, which means that the flatting effect improves, as the diffusibility of the light reflected from the surface of the optical film (more specifically, the surface of the coating film formed by applying the coating agent) increases.

Example 14: Method for Manufacturing External Preparation (Body Lotion)

Body lotion was obtained by sufficiently mixing, by a mixer, the following: 3 parts by weight of the composite particles obtained in Example 8; 50 parts by weight of ethanol, 0.1 part by weight of glycyrrhizic acid; 0.5 part by weight of perfume; and 46.4 parts by weight of purified water.

The present invention may be embodied in other forms without departing from the gist or essential characteristics thereof. The foregoing examples are therefore to be considered in all respects as illustrative and not limiting. The scope of the present invention is indicated by the appended claims rather than by the foregoing description, and all modifications and changes that come within the meaning and range of equivalency of the claims are intended to be embraced therein.

INDUSTRIAL APPLICABILITY

The composite particles of the present invention may be applicable, for example, to: an additive (a flatting agent, a coating film softening agent, a texturing agent or the like) to a coating agent (coating composition) used as coating material, a paper coating agent, a recording paper coating agent or a coating agent for optical member such as an optical film; a light diffusing agent added to a light diffusibility resin composition for producing a light diffuser (a lighting cover, a light diffusion plate, a light diffusion film or the like); an anti-blocking agent for a film such as a food wrap film; and a material for an external preparation including an additive for an external preparation (additive for improving lubricity, or for correcting skin defects such as freckles and wrinkles) such as cosmetics.

The invention claimed is:

1. A method for producing composite particles containing polymer particles and silica particles that adhere to the polymer particles, comprising:
   an adsorption step of treating silica particles with a water-soluble cellulose compound by making silica particles coexist with the water-soluble cellulose compound at a temperature of (T-15) ° C. or more, wherein T represents a lower critical solution temperature (° C.) or a cloud point (° C.) of the water-soluble cellulose compound, so as to adsorb the water-soluble cellulose compound onto the surfaces of the silica particles; and
   a polymerization step of subjecting a polymerizable monomer to aqueous suspension polymerization in the presence of the silica particles and the water-soluble cellulose compound adsorbing onto surfaces of the silica particles so as to obtain composite particles in which the polymer particles are at least partially covered by a layer of the silica particles.

2. The method for producing composite particles according to claim 1,
   wherein at least one of hydroxypropyl cellulose and hydroxypropyl methylcellulose is used as the water-soluble cellulose compound.

3. The method for producing composite particles according to claim 1,
   wherein an amount of the silica particles is from 0.022 to 0.15 g/m$^2$ per unit surface area of the composite particles.

* * * * *